(12) United States Patent
LaBauve et al.

(10) Patent No.: US 9,668,175 B2
(45) Date of Patent: *May 30, 2017

(54) HANDSET TRANSITIONS IN A DUAL-MODE ENVIRONMENT

(71) Applicant: Qwest Communications International Inc., Denver, CO (US)

(72) Inventors: Lance LaBauve, Highlands Ranch, CO (US); Charles I. Cook, Louisville, CO (US); Gilman R. Stevens, Fairview, TX (US)

(73) Assignee: Qwest Communications International Inc., Denver, CO (US)

( * ) Notice: Subject to any disclaimer, the term of this patent is extended or adjusted under 35 U.S.C. 154(b) by 148 days.

This patent is subject to a terminal disclaimer.

(21) Appl. No.: 14/619,923

(22) Filed: Feb. 11, 2015

(65) Prior Publication Data

US 2015/0156684 A1 Jun. 4, 2015

Related U.S. Application Data

(63) Continuation of application No. 11/490,515, filed on Jul. 19, 2006, now Pat. No. 8,989,813, and a
(Continued)

(51) Int. Cl.
*H04W 4/00* (2009.01)
*H04W 36/00* (2009.01)
(Continued)

(52) U.S. Cl.
CPC ... *H04W 36/0022* (2013.01); *H04L 29/06027* (2013.01); *H04L 29/1216* (2013.01);
(Continued)

(58) Field of Classification Search
CPC ...... H04W 72/04; H04W 88/08; H04W 76/00
See application file for complete search history.

(56) References Cited

U.S. PATENT DOCUMENTS 6,167,261 A   12/2000 Amin
6,253,249 B1* 6/2001 Belzile .................. H04L 12/66
                                              370/259
(Continued)

OTHER PUBLICATIONS

U.S. Appl. No. 11/101,160, Appeal Decision dated Sep. 25, 2015; 7 pages.
(Continued)

*Primary Examiner* — Lonnie Sweet
*Assistant Examiner* — Siren Wei
(74) *Attorney, Agent, or Firm* — Swanson & Bratschun, L.L.C.

(57) ABSTRACT

Embodiments of the invention provide novel solutions, including systems, methods and/or software, for handling calls in a dual-mode VoIP/cellular environment. Merely by way of example, some systems can be configured to determine whether to use a VoIP system or a cellular system to handle a particular call, and/or to transition a call from one network to the other network. Other systems can be configured to substitute a public number (which might be, for example, a VoIP number) for a private number (which might be, for example, a cellular number) when routing a call originating from a dual-mode phone on a cellular network. Further systems can be configured to allow a VoIP system to serve as an anchor for calls originated and/or delivered on a cellular system, for instance to facilitate a transition between cellular and VoIP service during a call.

20 Claims, 21 Drawing Sheets

Related U.S. Application Data continuation-in-part of application No. 11/101,160, filed on Apr. 6, 2005, now Pat. No. 9,363,384, and a continuation-in-part of application No. 11/101,182, filed on Apr. 6, 2005, now Pat. No. 9,363,370.

(60) Provisional application No. 60/700,839, filed on Jul. 19, 2005, provisional application No. 60/700,842, filed on Jul. 19, 2005.

(51) Int. Cl.

| | |
|---|---|
| *H04L 29/06* | (2006.01) |
| *H04L 29/12* | (2006.01) |
| *H04W 60/00* | (2009.01) |
| *H04W 88/06* | (2009.01) |
| *H04M 7/00* | (2006.01) |
| *H04W 36/18* | (2009.01) |
| *H04W 36/30* | (2009.01) |
| *H04W 60/06* | (2009.01) |
| *H04M 1/253* | (2006.01) |
| *H04W 80/04* | (2009.01) |
| *H04W 84/04* | (2009.01) |

(52) U.S. Cl.
CPC ........ *H04L 61/157* (2013.01); *H04L 65/1069* (2013.01); *H04L 65/80* (2013.01); *H04M 7/006* (2013.01); *H04W 36/18* (2013.01); *H04W 36/30* (2013.01); *H04W 60/005* (2013.01); *H04W 60/06* (2013.01); *H04W 88/06* (2013.01); *H04M 1/2535* (2013.01); *H04M 2250/02* (2013.01); *H04M 2250/06* (2013.01); *H04W 80/04* (2013.01); *H04W 84/042* (2013.01)

(56) References Cited

U.S. PATENT DOCUMENTS

| | | |
|---|---|---|
| 6,317,609 B1 | 11/2001 | Alperovich et al. |
| 6,363,065 B1 | 3/2002 | Thornton et al. |
| 6,363,253 B1 | 3/2002 | Valentine et al. |
| 6,542,499 B1* | 4/2003 | Murphy ............ H04L 12/5692 370/238 |
| 6,577,637 B1 | 6/2003 | Sieppi |
| 6,622,016 B1 | 9/2003 | Sladek et al. |
| 6,636,504 B1 | 10/2003 | Albers et al. |
| 6,768,738 B1 | 7/2004 | Yazaki et al. |
| 6,795,444 B1 | 9/2004 | Vo et al. |
| 6,865,266 B1 | 3/2005 | Pershan |
| 6,888,808 B2 | 5/2005 | Jagadeesan et al. |
| 6,940,848 B1 | 9/2005 | Liu et al. |
| 6,947,531 B1 | 9/2005 | Lewis et al. |
| 6,954,441 B2 | 10/2005 | Musikka |
| 6,965,666 B1 | 11/2005 | Zhang |
| 6,993,359 B1 | 1/2006 | Nelakanti et al. |
| 7,039,027 B2 | 5/2006 | Bridgelall |
| 7,046,647 B2 | 5/2006 | Oba et al. |
| 7,050,813 B1 | 5/2006 | Paiz |
| 7,054,636 B1 | 5/2006 | Howe |
| 7,065,363 B1 | 6/2006 | Pruuden et al. |
| 7,068,622 B2 | 6/2006 | Jagadeesan et al. |
| 7,082,301 B2 | 7/2006 | Jagadeesan et al. |
| 7,103,168 B2 | 9/2006 | Bedingfield et al. |
| 7,120,135 B2 | 10/2006 | Kim |
| 7,136,651 B2 | 11/2006 | Kalavade |
| 7,142,657 B2 | 11/2006 | Woodson et al. |
| 7,154,868 B1 | 12/2006 | Sharma et al. |
| 7,162,236 B2 | 1/2007 | Dorenbosch |
| 7,171,209 B2 | 1/2007 | Numminen et al. |
| 7,184,418 B1 | 2/2007 | Baba et al. |
| 7,200,400 B2 | 4/2007 | Creamer et al. |
| 7,203,185 B1 | 4/2007 | Dhara et al. |
| 7,206,582 B2 | 4/2007 | Tom et al. |
| 7,227,853 B2 | 6/2007 | Jagadeesan et al. |
| 7,242,757 B2 | 7/2007 | Hahm et al. |
| 7,263,354 B2 | 8/2007 | Naim et al. |
| 7,269,164 B2 | 9/2007 | Heubel et al. |
| 7,280,505 B2 | 10/2007 | Chaskar |
| 7,283,823 B2 | 10/2007 | Pearce et al. |
| 7,298,833 B2 | 11/2007 | Klein et al. |
| 7,302,258 B1 | 11/2007 | Sylvain |
| 7,319,864 B2 | 1/2008 | Jagadeesan et al. |
| 7,342,919 B2 | 3/2008 | Zhang et al. |
| 7,353,022 B2 | 4/2008 | Howe |
| 7,356,001 B1 | 4/2008 | Jones |
| 7,383,046 B2 | 6/2008 | Jagadeesan et al. |
| 7,408,935 B2 | 8/2008 | Yazaki et al. |
| 7,450,563 B2 | 11/2008 | Cook et al. |
| 7,475,140 B2 | 1/2009 | Requena |
| 7,502,615 B2 | 3/2009 | Wilhoite et al. |
| 7,519,049 B2 | 4/2009 | Masuda |
| 7,542,558 B2 | 6/2009 | Klein et al. |
| 7,565,167 B2 | 7/2009 | Lee et al. |
| 7,606,568 B2 | 10/2009 | Gallagher |
| 7,610,047 B2 | 10/2009 | Hicks et al. |
| 7,626,932 B2 | 12/2009 | Tuulos et al. |
| 7,634,269 B2 | 12/2009 | Gallagher |
| 7,634,270 B2 | 12/2009 | Gallagher |
| 7,634,271 B2 | 12/2009 | Gallagher |
| 7,640,008 B2 | 12/2009 | Gallagher |
| 7,664,501 B2 | 2/2010 | Dutta et al. |
| 7,668,558 B2 | 2/2010 | Gallagher |
| 7,684,803 B2 | 3/2010 | Gallagher |
| 7,693,135 B2 | 4/2010 | Pershan |
| 7,720,481 B2 | 5/2010 | Gallagher et al. |
| 7,742,768 B2 | 6/2010 | Liu et al. |
| 7,769,385 B2 | 8/2010 | Gallagher |
| 7,773,993 B2 | 8/2010 | Gallagher |
| 7,809,381 B2 | 10/2010 | Aborn et al. |
| 7,818,007 B2 | 10/2010 | Gallagher |
| 7,826,868 B2 | 11/2010 | Robbins et al. |
| 7,890,099 B2 | 2/2011 | Mohammed |
| 7,949,326 B2 | 5/2011 | Gallagher |
| 7,996,006 B2 | 8/2011 | Howe |
| 8,005,070 B2 | 8/2011 | Marsh et al. |
| 8,036,192 B2 | 10/2011 | Yaqub et al. |
| 8,054,165 B2 | 11/2011 | Gallagher |
| 8,090,371 B2 | 1/2012 | Gallagher |
| 8,150,401 B2 | 4/2012 | Howe |
| 8,825,108 B2 | 9/2014 | LaBauve |
| 8,843,107 B2 | 9/2014 | Altberg et al. |
| 8,989,813 B2 | 3/2015 | LaBauve |
| 9,363,370 B2 | 6/2016 | LaBauve et al. |
| 9,363,384 B2 | 6/2016 | LaBauve et al. |
| 2001/0046215 A1 | 11/2001 | Kim |
| 2002/0058494 A1 | 5/2002 | Timonen et al. |
| 2002/0075850 A1 | 6/2002 | Cruz et al. |
| 2002/0085516 A1 | 7/2002 | Bridgelall |
| 2002/0133457 A1 | 9/2002 | Gerlach |
| 2002/0137538 A1 | 9/2002 | Chen et al. |
| 2002/0141381 A1 | 10/2002 | Gawargy et al. |
| 2002/0147008 A1 | 10/2002 | Kallio |
| 2003/0003868 A1* | 1/2003 | Juurikko ............ H04B 17/318 455/41.1 |
| 2003/0095542 A1* | 5/2003 | Chang ................ H04M 7/0057 370/352 |
| 2004/0072593 A1 | 4/2004 | Robbins et al. |
| 2004/0090954 A1 | 5/2004 | Zhang et al. |
| 2004/0127194 A1 | 7/2004 | Lippelt |
| 2004/0157610 A1 | 8/2004 | Black et al. |
| 2004/0180654 A1 | 9/2004 | Chen |
| 2004/0196810 A1 | 10/2004 | Kil et al. |
| 2004/0203791 A1 | 10/2004 | Pan et al. |
| 2004/0213212 A1 | 10/2004 | Reding et al. |
| 2004/0240441 A1 | 12/2004 | Sriram |
| 2004/0246990 A1 | 12/2004 | Krishnamurthi et al. |
| 2004/0248593 A1 | 12/2004 | Hicks et al. |
| 2004/0248595 A1 | 12/2004 | Hicks et al. |
| 2004/0259541 A1 | 12/2004 | Hicks et al. |
| 2004/0264410 A1 | 12/2004 | Sagi et al. |
| 2004/0266426 A1 | 12/2004 | Marsh et al. |
| 2004/0266437 A1 | 12/2004 | Vempati et al. |

(56) References Cited

U.S. PATENT DOCUMENTS

| | | |
|---|---|---|
| 2005/0038876 A1 | 2/2005 | Chaudhuri |
| 2005/0063359 A1 | 3/2005 | Jagadeesan et al. |
| 2005/0070288 A1* | 3/2005 | Belkin .............. H04W 36/0066 455/439 |
| 2005/0090259 A1* | 4/2005 | Jain ........................ H04L 29/06 455/439 |
| 2005/0101329 A1 | 5/2005 | Gallagher |
| 2005/0136890 A1 | 6/2005 | Lippelt |
| 2005/0147049 A1 | 7/2005 | Ganesan |
| 2005/0148353 A1 | 7/2005 | Hicks et al. |
| 2005/0148362 A1 | 7/2005 | Jagadeesan et al. |
| 2005/0152343 A1 | 7/2005 | Rajagopalan |
| 2005/0190721 A1 | 9/2005 | Pershan |
| 2005/0190747 A1 | 9/2005 | Sindhwani et al. |
| 2005/0195802 A1 | 9/2005 | Klein et al. |
| 2005/0195954 A1 | 9/2005 | Klein et al. |
| 2005/0201362 A1 | 9/2005 | Klein et al. |
| 2005/0239498 A1 | 10/2005 | Dorenbosch |
| 2005/0271011 A1* | 12/2005 | Alemany .............. H04W 36/28 370/331 |
| 2005/0286466 A1 | 12/2005 | Tagg et al. |
| 2006/0019664 A1 | 1/2006 | Nelakanti et al. |
| 2006/0019667 A1 | 1/2006 | Hicks, III |
| 2006/0025141 A1 | 2/2006 | Marsh et al. |
| 2006/0045069 A1 | 3/2006 | Zehavi et al. |
| 2006/0046714 A1 | 3/2006 | Kalavade |
| 2006/0058032 A1 | 3/2006 | Pearce et al. |
| 2006/0072726 A1 | 4/2006 | Klein et al. |
| 2006/0083199 A1 | 4/2006 | Yang |
| 2006/0089169 A1 | 4/2006 | Tsao et al. |
| 2006/0092925 A1 | 5/2006 | Svensson et al. |
| 2006/0098801 A1 | 5/2006 | Hahm et al. |
| 2006/0105754 A1 | 5/2006 | Jagadeesan et al. |
| 2006/0105766 A1 | 5/2006 | Azada et al. |
| 2006/0105770 A1 | 5/2006 | Jagadeesan et al. |
| 2006/0109819 A1 | 5/2006 | Marin et al. |
| 2006/0111114 A1 | 5/2006 | Marin et al. |
| 2006/0111115 A1 | 5/2006 | Marin et al. |
| 2006/0116127 A1 | 6/2006 | Wilhoite et al. |
| 2006/0120351 A1 | 6/2006 | Rajagopalan |
| 2006/0121891 A1 | 6/2006 | Jagadeesan et al. |
| 2006/0121902 A1 | 6/2006 | Jagadeesan et al. |
| 2006/0121916 A1 | 6/2006 | Aborn et al. |
| 2006/0142010 A1 | 6/2006 | Tom et al. |
| 2006/0146793 A1 | 7/2006 | Benco et al. |
| 2006/0147022 A1 | 7/2006 | Karnalkar et al. |
| 2006/0176874 A1 | 8/2006 | Shaffer et al. |
| 2006/0176876 A1 | 8/2006 | Aborn et al. |
| 2006/0178147 A1 | 8/2006 | Jagadeesan et al. |
| 2006/0183478 A1 | 8/2006 | Jagadeesan et al. |
| 2006/0205392 A1 | 9/2006 | Jagadeesan et al. |
| 2006/0205436 A1 | 9/2006 | Liu et al. |
| 2006/0209794 A1 | 9/2006 | Bae |
| 2006/0229090 A1 | 10/2006 | LaDue |
| 2006/0229098 A1 | 10/2006 | LaBauve et al. |
| 2006/0229101 A1 | 10/2006 | LaBauve et al. |
| 2006/0233339 A1 | 10/2006 | Schwartz |
| 2006/0251113 A1 | 11/2006 | Jagadeesan et al. |
| 2006/0268750 A1 | 11/2006 | Weiner |
| 2006/0276192 A1 | 12/2006 | Dutta et al. |
| 2006/0281443 A1 | 12/2006 | Chen et al. |
| 2007/0015535 A1 | 1/2007 | LaBauve et al. |
| 2007/0015536 A1 | 1/2007 | LaBauve et al. |
| 2007/0026862 A1 | 2/2007 | Hicks et al. |
| 2007/0036143 A1 | 2/2007 | Alt |
| 2007/0060124 A1 | 3/2007 | Kalavade |
| 2007/0070976 A1 | 3/2007 | Mussman et al. |
| 2007/0091845 A1 | 4/2007 | Brideglall |
| 2007/0116249 A1 | 5/2007 | Bedingfield et al. |
| 2007/0281687 A1 | 12/2007 | Jiang |
| 2007/0293216 A1 | 12/2007 | Jiang |
| 2008/0020756 A1 | 1/2008 | Jiang |
| 2008/0025295 A1 | 1/2008 | Elliott et al. |
| 2008/0058003 A1 | 3/2008 | Rydnell et al. |
| 2008/0076428 A1 | 3/2008 | Jagadeesan et al. |
| 2008/0152123 A1 | 6/2008 | Pazhyannur et al. |
| 2008/0299976 A1 | 12/2008 | Gallagher |
| 2008/0311916 A1 | 12/2008 | Gallagher |
| 2009/0016519 A1 | 1/2009 | Bedingfield et al. |
| 2009/0082012 A1 | 3/2009 | Gallagher |
| 2009/0082022 A1 | 3/2009 | Gallagher |
| 2009/0170519 A1 | 7/2009 | Wilhoite et al. |
| 2009/0190468 A1 | 7/2009 | Gillot et al. |
| 2009/0245179 A1 | 10/2009 | Liu et al. |
| 2009/0285371 A1 | 11/2009 | Easley et al. |
| 2010/0150110 A1 | 6/2010 | Dutta et al. |
| 2012/0069754 A1 | 3/2012 | Marsh et al. |
| 2014/0335854 A1 | 11/2014 | LaBauve et al. |
| 2015/0257045 A1 | 9/2015 | LaBauve et al. |

OTHER PUBLICATIONS

U.S. Appl. No. 11/101,182; Decision on Appeal dated Sep. 28, 2015; 7 pages.

U.S. Appl. No. 11/101,182; Notice of Allowance dated Dec. 3, 2015; 19 pages.

U.S. Appl. No. 11/101,160; Notice of Allowance dated Dec. 4, 2015; 20 pages.

U.S. Appl. No. 11/101,160; Notice of Allowance dated Feb. 4, 2016; 26 pages.

U.S. Appl. No. 11/101,182; Notice of Allowance dated Feb. 17, 2016; 25 pages.

U.S. Appl. No. 11/101,160, Office Action dated Mar. 18, 2008, 23 pages.

United States Patent and Trademark Office International Search Report and Written Opinion, Dec. 1, 2008, pp. 1-7.

U.S. Appl. No. 11/490,492; Office Action dated Jun. 3, 2009; 20 pages.

U.S. Appl. No. 11/101,182, Office Action dated Nov. 13, 2009, 12 pages.

U.S. Appl. No. 11/490,492, Final Office Action dated Dec. 28, 2009.

U.S. Appl. No. 11/490,492, Advisory Action dated Mar. 25, 2010.

U.S. Appl. No. 11/490,515, Office Action dated May 21, 2010; 14 pages.

U.S. Appl. No. 11/101,182; Final Office Action dated Jun. 17, 2010; 11 pages.

U.S. Appl. No. 11/101,160, Office Action dated Mar. 27, 2009, 15 pages.

U.S. Appl. No. 11/101,160, Office Action dated Nov. 23, 2009, 14 pages.

U.S. Appl. No. 11/101,160, Final Office Action dated Jan. 6, 2009, 16 pages.

U.S. Appl. No. 11/101,160, Final Office Action dated Jun. 18, 2010.

U.S. Appl. No. 11/101,182, Final Office Action dated Jan. 7, 2009, 14 pages.

U.S. Appl. No. 11/101,182, Final Office Action dated Jun. 17, 2010.

U.S. Appl. No. 11/101,182, Office Action dated Mar. 30, 2009, 11 pages.

U.S. Appl. No. 11/101,182, Office Action dated Mar. 21, 2008, 18 pages.

U.S. Appl. No. 11/490,515, Office Action dated Apr. 24, 2009, 13 pages.

U.S. Appl. No. 11/490,515, Office Action dated Jan. 5, 2009.

U.S. Appl. No. 11/490,515, Office Action dated Nov. 5, 2009, 12 pages.

U.S. Appl. No. 11/490,515, Final Office Action dated May 21, 2010.

U.S. Appl. No. 11/101,182; Office Action dated Oct. 26, 2010; 12 pages.

U.S. Appl. No. 11/490,515, Office Action dated Nov. 17, 2010; 20 pages.

U.S. Appl. No. 11/101,160; Non Final Office Action dated Dec. 2, 2010; 17 pages.

U.S. Appl. No. 11/490,515, Office Action dated Mar. 9, 2011; 21 pages.

U.S. Appl. No. 11/101,182; Office Action dated Mar. 18, 2011; 13 pages.

U.S. Appl. No. 11/101,160; Office Action dated May 10, 2011; 28 pages.

(56) References Cited

OTHER PUBLICATIONS

U.S. Appl. No. 11/101,182; Final Office Action dated Sep. 13, 2011; 14 pages.
U.S. Appl. No. 11/101,160, Final Office Action dated Sep. 15, 2011; 19 pages.
U.S. Appl. No. 11/490,515; Examiner's Answer dated Oct. 24, 2011; 32 pages.
U.S. Appl. No. 11/101,182; Non Final Office Action dated Dec. 20, 2011; 14 pages.
U.S. Appl. No. 11/101,160; Non Final Office Action dated Dec. 21, 2011; 23 pages.
U.S. Appl. No. 11/101,182; Interview Summary dated Jan. 25, 2012; 3 pages.
U.S. Appl. No. 11/101,160; Interview Summary dated Jan. 26, 2012; 3 pages.
U.S. Appl. No. 11/490,515; Office Communication dated Feb. 22, 2012; 3 pages.
U.S. Appl. No. No. 11/490,492; Non Final Office Action dated Feb. 27, 2012; 40 pages.
U.S. Appl. No. 11/101,182; Final Rejection dated Apr. 10, 2012; 19 pages.
U.S. Appl. No. 11/101,160; Final Rejection dated Apr. 11, 2012; 29 pages.
U.S. Appl. No. 11/490,492; Final Rejection dated Sep. 13, 2012; 42 pages.
U.S. Appl. No. 11/101,160; Examiner's Answer dated Jan. 3, 2013; 9 pages.
U.S. Appl. No. 11/101,182; Examiner's Answer dated Jan. 4, 2013; 9 pages.
U.S. Appl. No. 11/490,492; Non-Final Rejection dated Jun. 20, 2013; 42 pages.
U.S. Appl. No. 11/490,492; Final Rejection dated Jan. 16, 2014; 25 pages.
U.S. Appl. No. 11/490,492; Notice of Allowance dated May 1, 2014; 27 pages.
U.S. Appl. No. 11/490,492; Issue Notification dated Aug. 13, 2014; 1 page.
U.S. Appl. No. 11/490,515; Decision on Appeal dated Nov. 4, 2014; 6 pages.
U.S. Appl. No. 11/490,515; Notice of Allowance dated Nov. 12, 2014; 26 pages.
U.S. Appl. No. 11/490,515, Issue Notification dated Mar. 4, 2015.
U.S. Appl. No. 11/101,160; Issue Notification dated May 18, 2016; 1 page.
U.S. Appl. No. 11/101,182; Issue Notification dated May 18, 2016; 1 page.
U.S. Appl. No. 14/341,482; Office Action dated Aug. 11, 2016; 5 pages.
U.S. Appl. No. 14/341,482; Non-Final Rejection dated Jan. 18, 2017; 38 pages.
U.S. Appl. No. 14/717,160; Non-Final Office Action dated Jan. 9, 2017; 53 pages.

* cited by examiner

HANDSET TRANSITIONS IN A DUAL-MODE ENVIRONMENT

CROSS-REFERENCES TO RELATED APPLICATIONS

This application is a continuation of U.S. patent application Ser. No. 11/490,515 (the "'515 application"), filed Jul. 19, 2006 by LaBauve et al. and titled, "Handset Registration in a Dual-Mode Environment".

The '515 application claims priority from provisional U.S. Application Ser. No. 60/700,839 filed Jul. 19, 2005 by LaBauve et al. and provisional U.S. Application Ser. No. 60/700,842 filed Jul. 19, 2005 by LaBauve et al.

The '515 application is a continuation-in-part of U.S. application Ser. No. 11/101,160, filed Apr. 6, 2005 by LaBauve et al. and is a continuation-in part of U.S. application Ser. No. 11/101,182, filed Apr. 6, 2005 by LaBauve et al.

This application may be related to U.S. application Ser. No. 14/341,182, filed Jul. 25, 2014 by LaBauve et al., which is a continuation of U.S. application Ser. No. 11/490,492 (now U.S. Pat. No. 8,825,108), filed on Jul. 19, 2006 by LaBauve et al.

The above-referenced applications and patents are incorporated herein by reference in their entirety, for all purposes.

BACKGROUND

The present disclosure relates generally to telecommunications and more specifically to call delivery in wireless and/or dual-mode environments.

Recent advances in telecommunications technology, including without limitation the ever-increasing availability of high-bandwidth data connections (such as broadband Internet access, etc.), have made voice over Internet Protocol ("VoIP") a feasible alternative for many telephone users. Merely by way of example, a residential subscriber might choose, in lieu of contracting through a Plain Old Telephone Service ("POTS") provider for voice service, to subscribe only to a broadband Internet connection (e.g., via cable modem, xDSL modem, wireless broadband, WiMAX, WiBro, WiFi, 802.xx, LMDS, etc.) and to contract with a VoIP provider for voice services.

In a typical VoIP system, a subscriber may use any available connection with the Internet (including without limitation, residential and/or commercial Internet connections, wireless "hotspots" in various public locations, Bluetooth connections with Internet-connected devices, etc.) to access, again via the Internet, a VoIP server maintained by a VoIP provider with which the subscriber has contracted. This arrangement provides multiple benefits to the subscriber. For one thing, the connection is portable, in that the user may make and/or receive calls (often using a single telephone number) from virtually any location with a sufficient Internet connection. Additionally, the use of the Internet to route calls often means that the user may obtain flat-rate (and/or low per-minute rate) long-distance and/or International voice service. Moreover, the use of the Internet to route calls allows the subscriber to maintain a "local" telephone number in any desired market where the provider has a point of presence, meaning for example that a subscriber located in Denver may maintain a local telephone number in Seattle, allowing callers in Seattle to reach the subscriber through a local call. Those skilled in the art will appreciate the many other features and enhanced services that may be provided by VoIP service.

In particular, the use of the Internet (and/or any other Internet Protocol ("IP") connection) to route VoIP calls can provide in substantial gains in efficiency (and thus substantial savings) for both subscribers and providers. Realizing these benefits, subscribers have begun to rely more heavily on VoIP as an alternative (and, in some cases, primary) mode of voice communications. Correspondingly, there is substantial market demand for ever more pervasive and comprehensive VoIP offerings.

One example of this market demand is for dual mode cellular/VoIP service. Those skilled in the art will appreciate that cellular service often carries relatively expensive per-minute charges (and/or monthly minute quotas with expensive overage charges). Cellular subscribers, then, desire the ability to use a single phone (ideally with a single number) in both a cellular network and for VoIP communications (e.g., through a wireless IP connection). Providers have embarked on plans to offer this service, and some phone manufacturers have begun to manufacture "dual mode" phones that can function as both cellular phones and VoIP phones.

To maximize the benefits of such services, subscribers generally desire a dual mode device and/or phone and/or network with the ability to transition seamlessly between cellular and VoIP modes, ideally during a call. For example, if a subscriber receives (inbound) or places (outbound) a VoIP call while accessing a broadband Internet connection (e.g., via WiFi, WiMax, 802.xx, LMDS, etc.) and subsequently (mid-call) loses that connection (either gradually or abruptly), the subscriber would like the call to transition mid-call to the macro cellular network. By the same token, if a subscriber receives (inbound) or places (outbound) a circuit switched cellular call and subsequently (mid-call) acquires a broadband Internet connection (again, perhaps, by traveling within range of a WiFi or WiMax transceiver), the subscriber would often prefer to seamlessly transition mid-call from the cellular network to a VoIP call over the broadband Internet connection, since a VoIP call typically will be less expensive than a cellular call. A typical subscriber, however, would not tolerate the inconvenience of ending the call and re-dialing the other party merely to use the VoIP service instead of the cellular service.

This, however, may present a logistical problem. For instance, if a subscriber originates a call in a cellular network, it may be possible to route the call from a cellular provider to a VoIP provider using a trunk connection, for example, and from the VoIP provider to the desired destination number. When the user obtains an IP connection, the cellular provider may handoff the call to the VoIP provider. One skilled in the art will appreciate, however, that in conventional systems, the trunk connection will remain active for the duration of the call. Even if the subscriber no longer has to pay charges associated with the cellular network, the VoIP provider may be forced to pay charges related to the use of the cellular providers' trunk ports, among other things. Thus, the VoIP provider often will be forced to absorb unnecessary overhead expenses, which may not be directly billable to the subscriber.

BRIEF SUMMARY OF THE INVENTION

Embodiments of the invention provide novel solutions, including systems, methods and/or software, for handling calls in a dual-mode VoIP/cellular environment. Merely by way of example, some systems can be configured to determine whether to use a VoIP system or a cellular system to handle a particular call, and/or to transition a call from one network to the other network. Other systems can be configured to substitute a public number (which might be, for example, a VoIP number) for a private number (which might be, for example, a cellular number) when routing a call originating from a dual-mode phone on a cellular network. Further systems can be configured to allow a VoIP system to serve as an anchor for calls originated and/or delivered on a cellular system, for instance to facilitate a transition between cellular and VoIP service during a call.

Other embodiments of the invention provide novel solutions, including systems, methods and/or software, for providing handoffs between cellular providers and VoIP providers. In some cases, for example, upon the initiation of a call from a dual-mode cellular phone, the cellular network (and/or a component thereof) may be configured to store the dialed number and/or substitute a predetermined number for the dialed number. The predetermined number may be associated with a VoIP provider's system. Hence, in a particular embodiment, the call may be routed (e.g., via the PSTN) to the VoIP provider's system, which may be configured to obtain (perhaps from an application server) the original dialed number and/or to route the call (e.g., via the PSTN) to the original dialed number. If the dual-mode phone subsequently obtains a broadband Internet connection (e.g., via WiFi, WiMax, 802.xx, LMDS, etc.), a VoIP connection may be established between the VoIP system and the phone and/or a mid-call handoff may be performed (e.g., in the VoIP system) to transition the call from the cellular connection to the VoIP connection. Optionally, the cellular connection may be disconnected.

One set of embodiments provides methods for handling calls in a dual-mode environment. An exemplary method may comprise a dual-mode phone registering with a cellular system, the dual-mode phone registering with a VoIP system and the dual-mode phone simultaneously maintaining active registrations with the cellular system and with the VoIP system.

Another exemplary method comprises a dual-mode phone participating in a first call with another party, the first call being carried on a VoIP connection with a VoIP system. The method may further comprise, in some embodiments, determining that a signal quality for the VoIP connection has fallen below a first threshold. A second call might be initiated between the VoIP system and the phone, wherein the second call is carried by the cellular system, and the second call might be answered. In certain embodiments, the method includes bridging the first call and the second call. The phone might then transition a microphone function and a speaker function from the first call to the second call, such that the phone is in communication with the other party via the second call. Finally, in some cases, the first call might be disconnected.

Yet another exemplary method might comprise determining whether the signal quality of a connection between a dual-mode phone and a VoIP system is above a first threshold. If the signal quality of the connection is above the first threshold, the dual-mode phone might be registered with the VoIP system. The method can further include, in some cases, determining whether the signal quality of the connection is above a second threshold. If the signal quality of the connection is not above the second threshold, the dual-mode phone might be deregistered from the VoIP system.

Yet another set of embodiments provides software programs for handling calls from dual-mode phones, including without limitation software comprising instructions to perform methods of the invention. A further set of embodiments provides systems, including without limitation systems configured to perform methods of the invention.

DETAILED DESCRIPTION OF THE INVENTION

Figure 1:
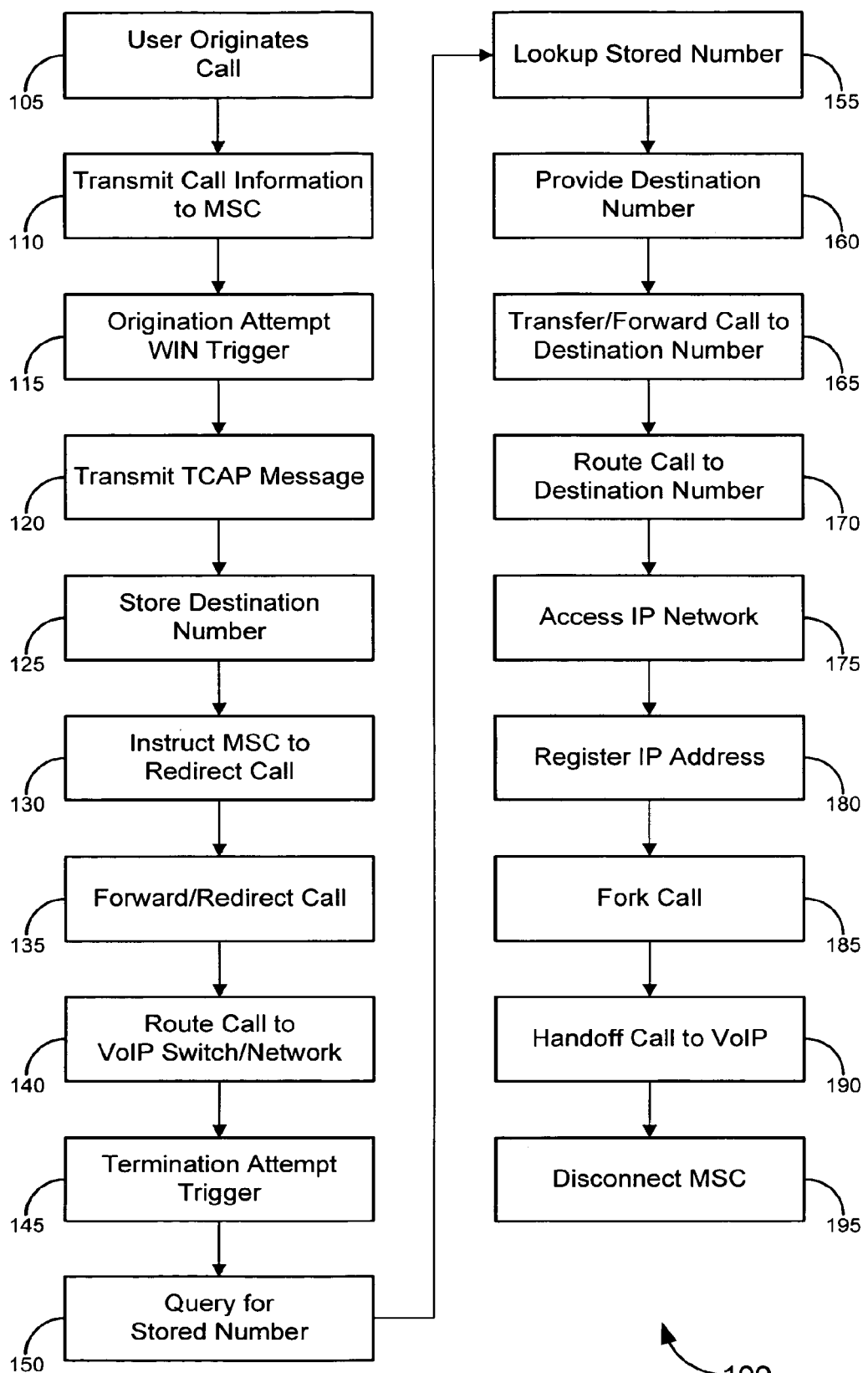
FIG. 1 illustrates a method of handling a cellular call in a VoIP environment, in accordance with various embodiments of the invention.

Embodiments of the invention provide novel solutions, including systems, methods and/or software, for handling calls in a dual-mode VoIP/cellular environment. Merely by way of example, some systems can be configured to determine whether to use a VoIP system or a cellular system to handle a particular call, and/or to transition a call from one network to the other network. Other systems can be configured to substitute a public number (which might be, for example, a VoIP number) for a private number (which might be, for example, a cellular number) when routing a call originating from a dual-mode phone on a cellular network. Further systems can be configured to allow a VoIP system to serve as an anchor for calls originated and/or delivered on a cellular system, for instance to facilitate a transition between cellular and VoIP service during a call.

As another example, upon the initiation of a call from a dual-mode cellular phone, the cellular network (and/or a component thereof) may be configured to store the dialed number and/or substitute a predetermined number for the dialed number. The predetermined number may be associated with a VoIP provider's system. Hence, in a particular embodiment, the call may be routed (e.g., via the PSTN) to the VoIP provider's system, which may be configured to obtain (perhaps from an application server) the original dialed number and/or to route the call (e.g., via the PSTN) to the original dialed number. If the dual-mode phone subsequently obtains IP access (e.g., via a broadband Internet connection, such as via WiFi, WiMax, 802.xx, LMDS, etc.), a VoIP connection may be established between the VoIP system and the phone and/or a handoff may be performed (e.g., in the VoIP system) to transition the call from the cellular connection to the VoIP connection. Optionally, the cellular connection may be disconnected.

As used herein, the term "cellular" should be interpreted in a broad sense to include any of the variety of known modes of wireless and/or mobile communications. Exemplary cellular systems include, but are not limited to time division multiple access ("TDMA") systems, code division multiple access ("CDMA") systems, such as those used by many wireless providers in the United States, global system for mobile communications ("GSM") systems used by many providers in Europe and Asia, as well as some providers in the United States. Other exemplary cellular systems include systems known in the art as "3G" systems and/or Enhanced Data Rates for GSM Evolution ("EDGE") systems, iDEN-based systems, satellite-based cellular systems and/or the like.

The term "VoIP" as used herein should be interpreted to mean any type of voice service that is provided over a data network, and in particular over an Internet Protocol-based network (of which the Internet is but one example). A phone capable of VoIP mode communications may be configured to use the session initiation protocol ("SIP"), the H.323 protocol, the MGCP protocol, the Inter-Asterisk Exchange ("IAX" or "IAX2") protocol and/or any other protocol designed to allow voice communications over data and/or IP networks.

Embodiments of the invention, then, provide for efficient call handling for "dual mode" phones; that is, phones that are capable of operating in a cellular mode (e.g., a circuit-switched cellular mode) and in a VoIP mode. (It should be noted that, while this document refers generally to "phones," embodiments of the invention may be implemented to provide service to any device that may operate in a dual mode as described herein, including merely by way of example, computers (including, inter alia, laptop computers), perhaps with cellular modems, personal digital assistants ("PDA"), PDA phones, and/or the like. Those skilled in the art will appreciate based on the disclosure herein, that a variety of devices may be configured to use cellular and/or VoIP communications, and that that embodiments of the invention correspondingly may be used with any such devices). Various manufacturers have begun manufacturing such phones (or have plans to do so); often, the phones are configured to operate as a standard cellular telephone and also have some data transmission capability. Merely by way of example, such phones may be configured to accept a data cable for communication with a computer, may have one (or more) of a variety of wireless transmitters and/or receivers (such as Bluetooth transceivers, WiFi transceivers, WiMax transceivers, 802.xx transceivers, LMDS transceivers, etc.). Virtually any mode of data communication between the phone and a network may be used in accordance with embodiments of the invention; in particular embodiments, the phone's data communication capabilities will support IP communication, which in turn will support VoIP communication.

Figure 2A:
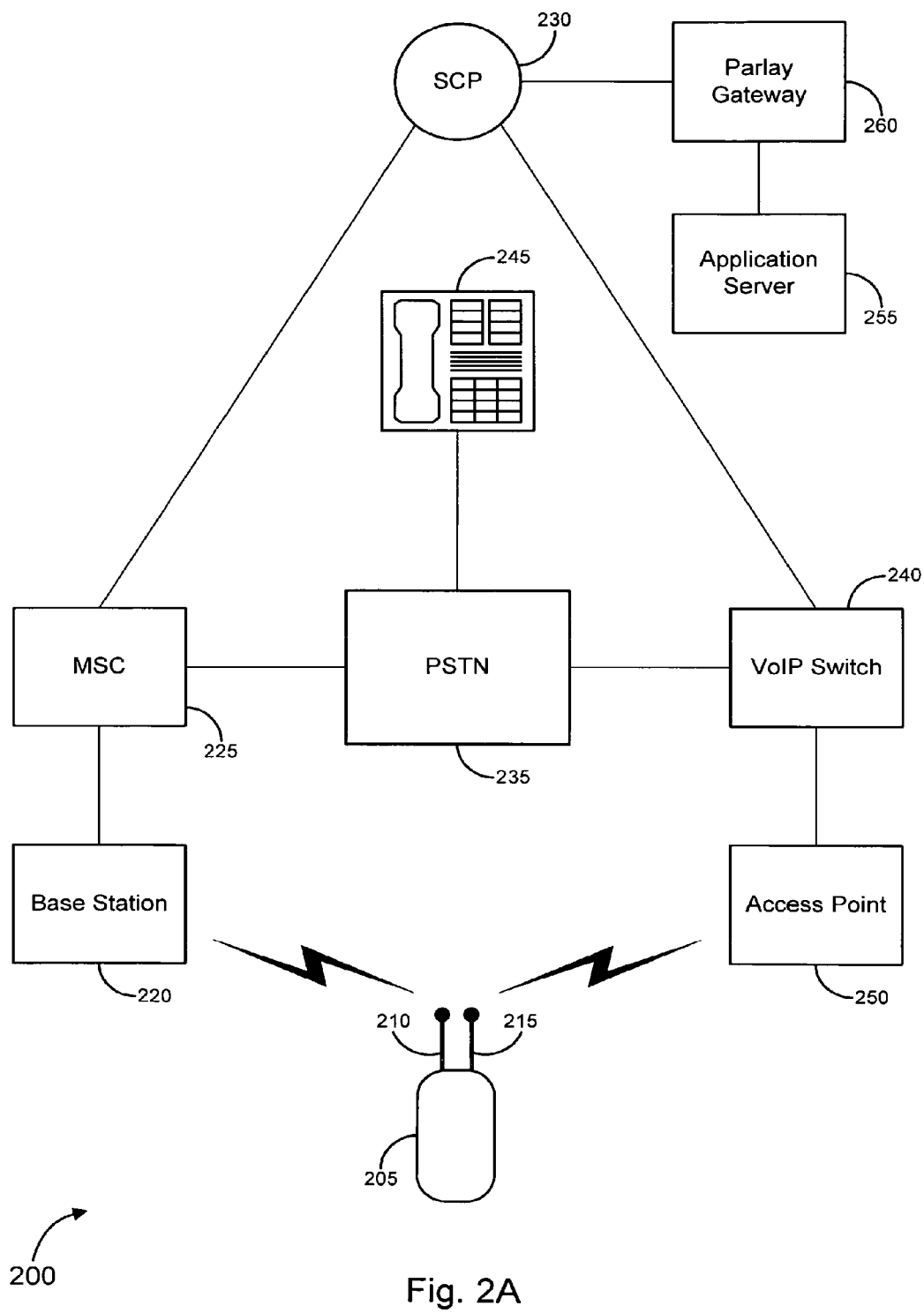
FIG. 2A illustrates a telecommunications system that can be configured to handle a cellular call in a VoIP environment, in accordance with various embodiments of the invention.

FIG. 1 illustrates a method 100 of handling calls in accordance with a set of embodiments. Another set of embodiments provides systems for handling calls, an example of which is illustrated by FIG. 2A. The method 100 of FIG. 1 may be (but need not be) performed by a system such as the system 200 illustrated by FIG. 2A.

The system 200 may comprise a cellular phone 205 (also referred to herein as a handset), which may be configured to operate as a dual mode phone. Accordingly, the phone 205 may comprise any equipment necessary for communicating with a cellular network and/or a VoIP network. Such components are known in the art and need not be described in detail herein. It is sufficient for purposes of this document to note that the phone 205 may comprise a cellular transmitting/receiving apparatus 210 (which may comprise one or more transmitters, receivers, processors, antennas, etc.) and/or a VoIP transmitting/receiving apparatus 215 (which may comprise one or more a wireless transmitters, receivers, processors, and antennas, receptacles for accepting a wired connection, etc. Merely by way of example, a phone that may be used with embodiments of the present invention may provide connectivity via 802.11a/b/g and CDMA/GSM. Motorola Corp. has announced plans to produce such phones. The phone may have a single, PSTN-routable phone number that can be used to place both cellular and VoIP calls. Alternatively, the phone may have two (or more) numbers, including without limitation a first number that is associated with a VoIP system and a second number that is associated with a cellular system.

The system 200 may also feature one or more standard cellular network components known in the art, such as a base station 220 and/or other device for providing communication between the phone 205 and the cellular system. The base station 220 may be in communication with a mobile switching center ("MSC") 225, of which a variety are commercially available. In a particular set of embodiments, the MSC 225 may be configured to allow for the implementation of wireless intelligent network ("WIN") triggers and/or other triggers known in the art. An example of such a trigger is an origination attempt trigger (such as a WIN OrigReq), which is triggered when the phone 205 attempts to originate a call using the cellular system. Although additional customization of the MSC 225 may be appropriate in some embodiments, other embodiments may utilize an MSC with standard configuration and/or programming.

The MSC 225 may be in communication with a signal control point ("SCP") 230, another cellular network component well known to those skilled in the art. As described in more detail below, the SCP 230 may be modified to operate in accordance with embodiments of the invention. In a particular set of embodiments, the MSC 225 may communicate with the SCP 230 using, inter alia, transaction capabilities application part ("TCAP") messages, including for example TCAP requests.

To provide connectivity between cellular subscribers (e.g., a user of the phone 205 illustrated in FIG. 2A), the MSC 225 may also be in communication with a telephone network such as the public switched telephone network ("PSTN") 235. (Those skilled in the art will appreciate that there may be additional devices that intermediate communications between a base station 220, MSC 225, SCP 230 and PSTN 235. Such devices may include base station controllers ("BSC"), signal switching points ("SSP"), signal transfer points ("STP") and/or other devices common to phone networks, and in particular to advanced intelligent networks ("AIN") and/or WINs. The topology and configuration of such devices and networks is well-known and need not be described here in detail.)

One or more VoIP systems may also be in communication with the PSTN 235 (and/or directly in communication with the cellular system). In a particular set of embodiments, a VoIP system may comprise a VoIP switch 240. Many different VoIP switches are commercially available from vendors such as 3Com, Cisco, Nortel, Sonus, Sylantro, BroadSoft, Lucent and others. In a set of embodiments, the VoIP switch 240 may be a softswitch, which may provide for distributed PSTN gateway and call handling functionality among a plurality of devices and/or locations. As part of a softswitch (and/or as a separate component), the system 200 may also include one or more application servers 255. The application server(s) 255 may be used to provide advanced functionality in a cellular network, WIN and/or AIN. In particular, an application server 255 may be used to provide call handling instructions (e.g. to an MSC 225 and/or to a VoIP switch 240) in accordance with embodiments of the invention. In some cases, the application server 255 may be in communication with an SCP 230, e.g., via SS7 communications, IP communications, etc. This communication may be direct and/or indirect. Merely by way of example, communication between the SCP 230 and the application server 255 may be handled by a parlay gateway 260, which may conform to the Parlay/OSA API known in the art. Alternatively, the SCP 230 may be configured to provide some call handling instructions, and/or the application server 255 and/or parlay gateway 260 may be omitted from some embodiments. In some embodiments, the SCP 230 may comprise and/or be integrated within the application server 255.

In a set of embodiments, the parlay gateway 260 and/or the application server 255 may also be in communication with the VoIP switch 240 (e.g., via SIP communications, triggers, etc.). In another set of embodiments (for example, as illustrated by FIG. 2A), the VoIP switch 240 may be in communication with the SCP 230 (and/or may obtain necessary information and/or instructions from the application server 255 via the SCP 230).

The VoIP system (and in particular cases, the VoIP switch 240) may be in communication with an access point 250, which can provide communication with the phone 205 (e.g., via an IP connection). While the VoIP system may have direct communication with the access point 250, such communication often occur over an IP network, such as the Internet, a private network, etc. The access point 250 can be any device that provides IP connectivity with the phone 250. Examples include wireless access points ("WAP"), Bluetooth transceivers; Ethernet hubs, switches and/or routers; broadband gateways, etc.

FIGS. 2B-2E illustrate the system 200 of FIG. 2A operating in accordance with the method 100 of FIG. 1, and the method 100 will be described with respect to these figures. (It should not be inferred, however, that methods of the invention necessarily are implemented using the exemplary system 200 of FIG. 2—the method 100 of FIG. 1 may be implemented independently of any specific hardware configuration).

At block 105, a subscriber attempts to originate a call via a cellular network to a destination (using a destination number associated with that destination). This step usually involves the subscriber dialing the destination number and pressing a "send" key on the phone 205. In response, the phone transmits call information (generally including, inter alia, the destination number, as well, perhaps as the calling number of the phone 205 and/or some other information sufficient to identify the phone 205 to the MSC) in conventional fashion to a base station 220, (block 110), which forwards the call information to an MSC 225. The MSC 225 may be configured to recognize the phone 205 (based, for example, on the call information and/or a subset thereof) as part of a group that requires special call processing. Hence, the call information may activate an origination attempt trigger (e.g., WIN OrigReq) at the MSC 225 (block 115).

The MSC 225, in many cases, will be configured, perhaps in response to the origination attempt trigger, to request instructions from a controlling device, such as an SCP 230 and/or application server 255 (block 120). This message may be in the form of a TCAP request (e.g., a message complying with ANSI-41, WIN, GSM, CAMEL or other appropriate standards). The TCAP request may also include the destination number. The destination number may be stored (block 125), e.g., in a database associated with an SCP 230, application server 255, MSC 225, etc. Other identifying information about the call (such as the calling number—the number of phone 205—a timestamp and/or call identifier) may also be stored and/or may be used to look up the destination number (as described below, for example). The controlling device (e.g., the SCP 230, application server 255, etc.) then may instruct the MSC 225 to forward the call to a number associated with the VoIP system, and/or more particularly, with a VoIP switch 240 (block 130). In some cases, this forwarding instruction may simply be the substitution by the SCP 230 of the forwarding number for the destination number. (While the term "forward" is used herein to describe the re-routing of a call from the MSC 225 to the VoIP system and/or network, it may be more appropriate, in some implementations, to consider this procedure as a redirection of the call initiated from the phone 205. Hence, the terms "forward" and "redirect" can be considered interchangeable in the context of routing a call from the MSC 225 to the VoIP system and/or network. Similarly, while the term "forward" is sometimes used herein to refer to the operation of the VoIP system to route the call to the intended destination number, that operation may, in some cases, be considered a call transfer operation; accordingly, in that context, the terms "forward" and "transfer" can be considered interchangeable.)

The MSC 225, then, may forward (or redirect) the call to the VoIP switch 240 in a conventional manner. Based on the disclosure herein, one skilled in the art will appreciate that often the PSTN 235 will be used to route the forwarded/redirected call (block 140). Merely by way of example, a trunk connection, well known in the art, may be used to forward the call from the MSC 225 to the VoIP switch 240. In an alternative embodiment, the MSC 225 (and/or another component of the cellular system) may have a dedicated and/or direct (i.e., not via the PSTN 235) connection with the VoIP switch 240. In such case, the MSC 225 may transfer the call directly to the VoIP switch 240 (perhaps based on an origination attempt trigger), and/or it may not be necessary for the MSC 225 to use a forwarding/redirection number.

Upon receiving the forwarded (or redirected) call, the VoIP system (and/or more particularly, the VoIP switch 240) may obtain the destination number (that is, the number associated with the destination the subscriber is attempting to contact). This process may be accomplished in a variety of ways. Merely by way of example, in some embodiments, the destination number may be transmitted by the cellular system (and/or a component thereof, such as the MSC 225), perhaps using in-band and/or out-of-band signaling as part of the forwarded/redirected call. Merely by way of example, the MSC 225 may be configured to place the destination number in one or more fields of an SS7 message (e.g., in an IAM) to the VoIP switch 240, and/or the destination number can be provided via in-band signaling (e.g., DTMF, tones, frequency shift keying ("FSK"), fax tones, etc.) by the MSC 225 and/or phone (e.g., in an automated two-stage dialing approach) and/or by the subscriber (e.g., in a manual two-stage dialing approach). In another set of embodiments, the reception of the forwarded/redirected call may activate a "termination attempt trigger" (or similar process) at the VoIP switch (block 145). The VoIP switch may then obtain the destination number (i.e., the number originally dialed by the subscriber) in response to the termination attempt trigger.

In some embodiments (for instance when the destination number is stored by an SCP and/or application server), the VoIP switch 240 may issue a query request for the stored destination number (block 150). For instance, the VoIP switch 240 may issue a query to an SCP 230 and/or application server 255 for the destination number (perhaps using an SS7 communication, such as a TCAP message, and/or an IP communication, such as a SIP communication, an XML communication, etc.). The query might key on a calling number, timestamp and/or other identifier, which may be stored with the destination number as described above. In some cases, the SCP 230 may have stored the number, and/or it may perform a database lookup for the number (block 155). In other cases, the destination may have been stored at an application server 255, and/or the SCP 230 may issue a request to the application server 255 for the destination number, perhaps via a parlay gateway 260, in a manner known in the art. Alternatively and/or additionally, the VoIP switch 240 may directly query the application server 255 for the destination number (e.g., in implementations where the VoIP switch 240 is in communication with the application server 255), perhaps via an IP communication, which again might be a SIP communication, an XML communication, an H.323 communication, etc. The SCP 230, application server 255 and/or any other appropriate device then may provide the destination number to the VoIP switch 240 (e.g., using a SIP communication, an SS7 communication and/or any other appropriate type of communication).

Figure 2B:
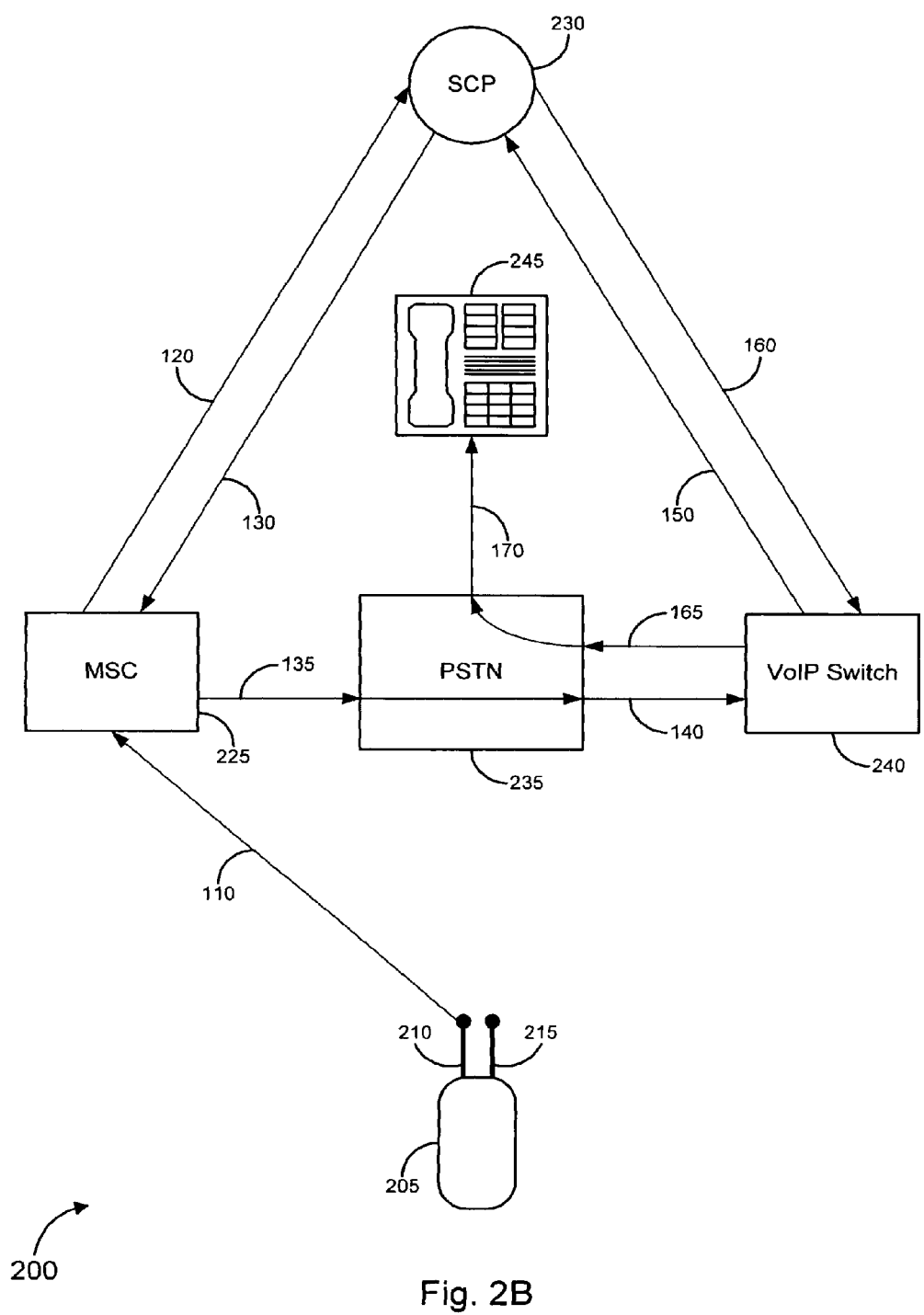
FIGS. 2B-2E illustrate the functioning of the telecommunications system of FIG. 2A, in accordance with various embodiments of the invention.
Figure 2C:
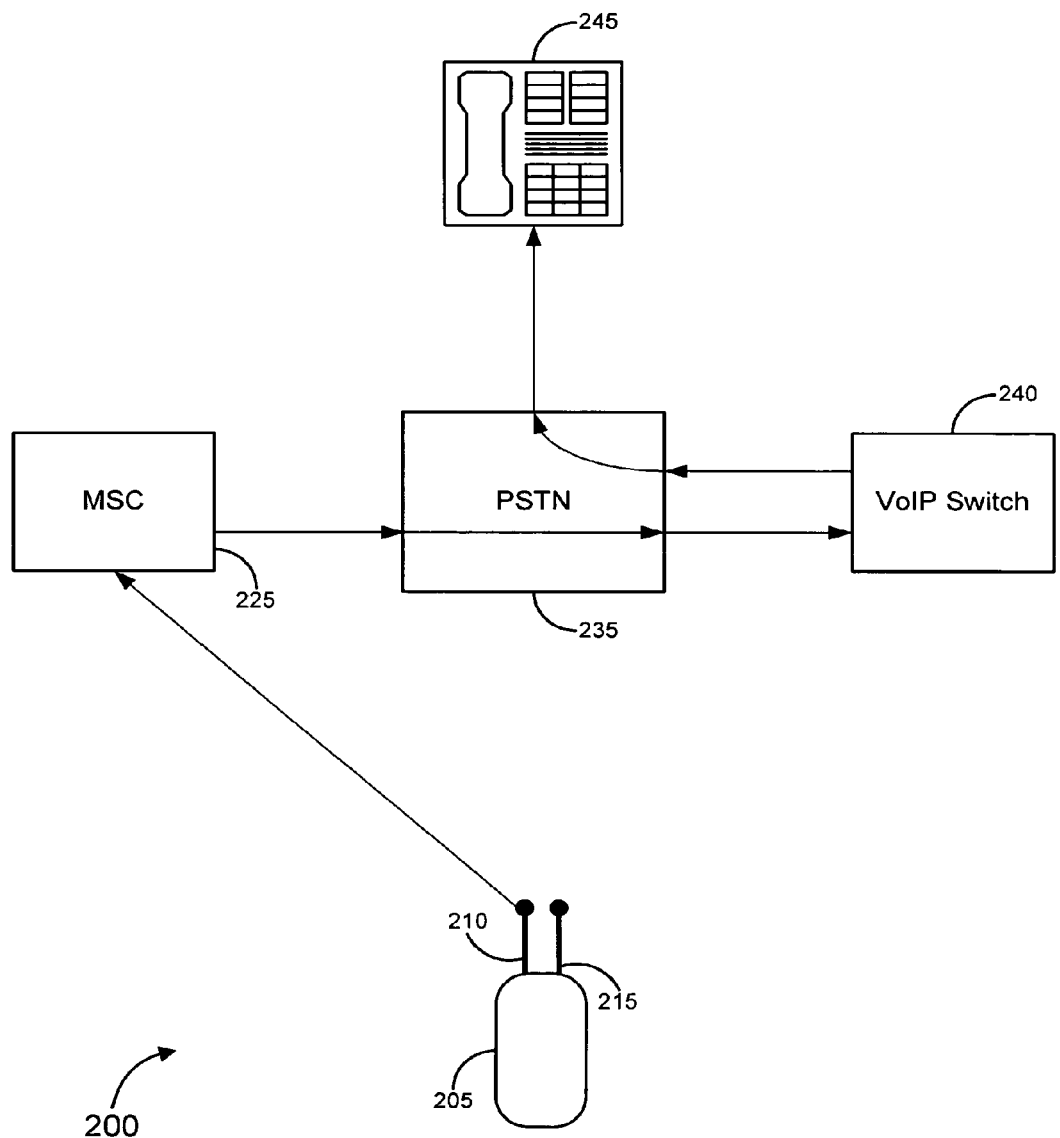

Regardless of how the VoIP switch 240 obtains the destination number (e.g., whether using in-band signaling, out-of-band signaling, or otherwise), the VoIP switch 240 then may forward (or transfer) the call to the destination 245 (block 165). Once again, this transferred call may be routed via the PSTN 235 as appropriate (block 170). This routing may be performed as if the subscriber had dialed the destination number from a VoIP connection originally. Hence, in some embodiments, the VoIP switch 240, not the cellular system, may be responsible for call control functions. Alternatively, and/or in addition, this could be implemented as a VoIP application on a wireless data connection. FIG. 2B illustrates the communication flow for blocks 105-170 using the system 200 of FIG. 2A, in accordance with some embodiments of the invention. FIG. 2C illustrates the call flow in the system 200 once the call has been routed from the MSC 225 to the VoIP switch 240 and terminated at the destination 245. The transmission path runs from the phone 205 to the MSC 225, through the PSTN 235 to the VoIP switch 240, back through the PSTN 235 and to the destination 245.

Figure 2D:
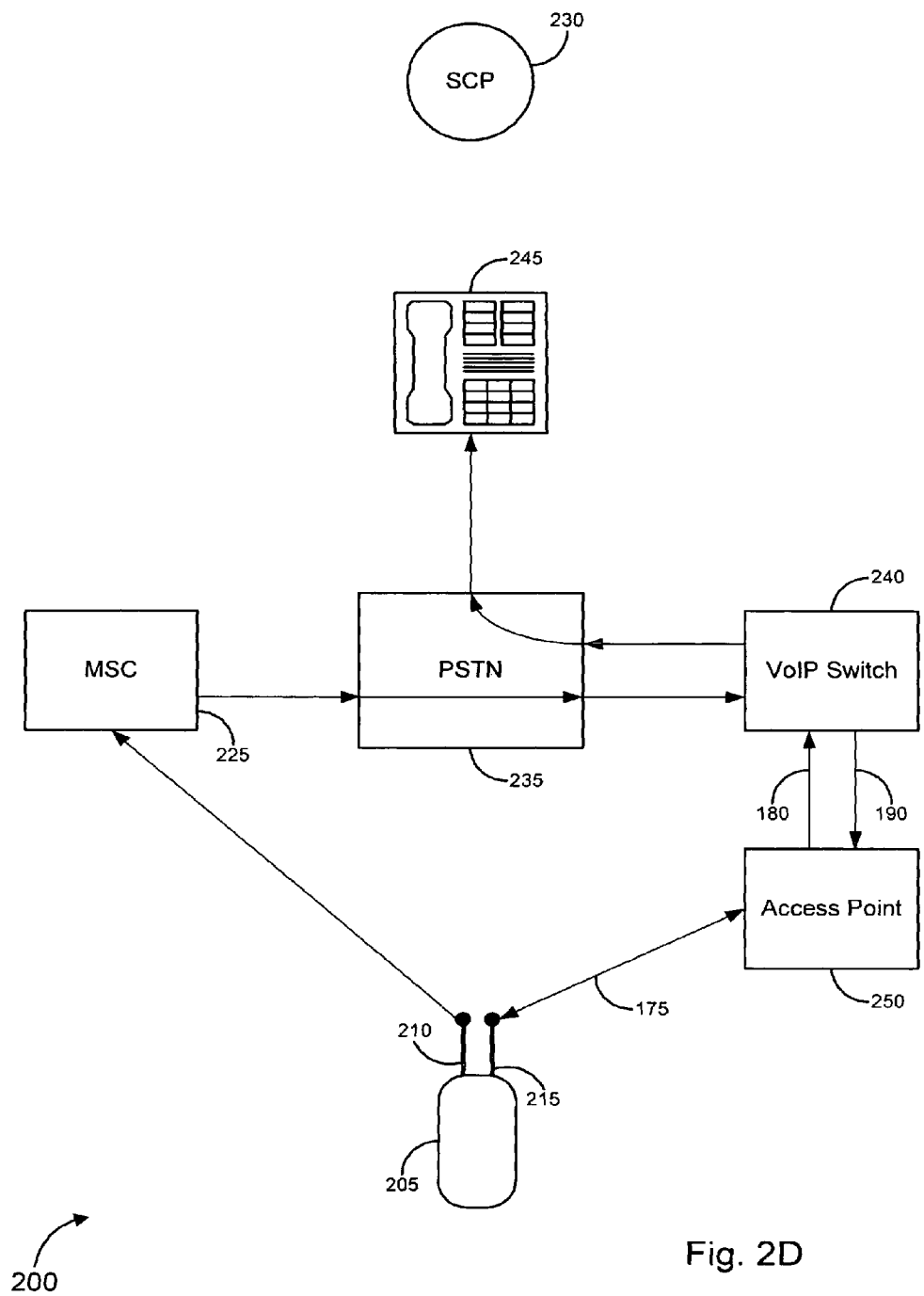

FIG. 2D illustrates the remaining steps of the method 100 of FIG. 1 as they might be implemented in the system 200 in some embodiments. At block 175, the phone 205 accesses an IP network (which, again, might be a private network, the Internet, etc.), e.g., at some point during the call. (It should be noted, of course, that the phone 205 might not access an IP network during the call, in which case the call simply proceeds using the cellular network, although routed through the VoIP switch 240.) Accessing an IP network might comprise plugging the phone into an Ethernet network in communication with the Internet, taking the phone within range of a Bluetooth network in communication with the Internet, etc. In a particular set of embodiments, for example, the phone 205 might enter into range of a WiFi or WiMax transceiver and/or access point 250. This process might involve subscriber interaction and/or might be performed automatically by the phone 205 (merely by way of example, the phone 205 might monitor periodically and/or constantly for WiFi transmissions from an access point 250, etc.).

Upon accessing the IP network, the phone 205 may register its IP address to the VoIP system (and/or the VoIP switch 240) (block 180) and/or otherwise identify itself to the VoIP switch 240. The process of registration may vary from implementation to implementation. For example, in some cases, the subscriber might take an affirmative action to instruct the phone 205 to perform this registration, while in other cases, the phone might be configured to register automatically upon obtaining IP access. In still other cases, the VoIP system may be configured to poll periodically for the phone 205, and/or the VoIP system may register the phone 205 when detected.

Upon registering the phone 205, the VoIP switch 240 typically will identify the phone 205 as a participant in a call being handled by the VoIP switch 240. For example, when the phone 205 registers with the VoIP switch 240, the VoIP switch 240 typically will identify the phone 205 (e.g., by phone number and/or another identifier). The VoIP switch 240 might then check a database of current calls for any calls involving the phone 205 (which would identify the call established earlier). The VoIP switch may then, during the call, transition the call from a cellular call to a VoIP call. In a set of embodiments, this transition may comprise forking the call (block 185). In forking the call, the VoIP switch 240 effectively maintains the connection with the phone 205 through the cellular network (i.e., through the MSC 225 and/or the base station 220 and the phone's cellular transmitting/receiving apparatus 210) and through a VoIP connection (i.e., through the access point and the phone's VoIP transmitting/receiving apparatus 215).

For example, the VoIP switch 240 might attempt to set up a "VoIP handoff leg" to/from the phone 205 via the IP connection (block 190), either, for example, by inducing the phone 205 to initiate a VoIP call (e.g., the phone 205 sends a SIP Invite) to the VoIP switch 240, or by initiating a VoIP call (e.g., the VoIP switch 240 sends a SIP Invite) to the phone 205. Whether the "VoIP handoff leg" is VoIP switch 240 initiated and/or phone 205 initiated, the phone 205 then might accept the mid-call handoff attempt (this may be performed automatically and/or upon prompting by the user, based perhaps on a notification, such as a tone, display, etc., by the phone to the subscriber that a VoIP connection is available for the call). It is anticipated that common dual-mode phones will have the ability to handle VoIP and cellular calls simultaneously, allowing the phone to receive both "legs" of the forked call.

The VoIP switch 240 will then handoff the call from the cellular network to the VoIP network (e.g., the IP connection with the phone 205). If the VoIP switch is able to fork the call (as described above), this handoff may be relatively seamless to the subscriber. Otherwise, there may be a relatively short pause while the handoff is performed.

In a set of embodiments, once the VoIP switch 240 has handed off the call to the VoIP network, the cellular network (or more particularly, in some cases, the MSC 225) may be disconnected from the call (block 195). In some cases, the phone 205 might be configured to automatically disconnect the cellular connection after the VoIP connection has been established. Alternatively and/or in addition, the VoIP switch 240 may be configured to disconnect the call, such that, to the cellular network, it may appear that the destination 245 has disconnected the call, and the MSC 225 then will tear down its connection with the phone 205 (and, as necessary, with the VoIP switch 240), ending the call from the point of view of the cellular network. In another set of embodiments, the phone 205 could initiate the handoff to the VoIP switch 240 upon registration with and/or acknowledgement of the VoIP switch.

Figure 2E:
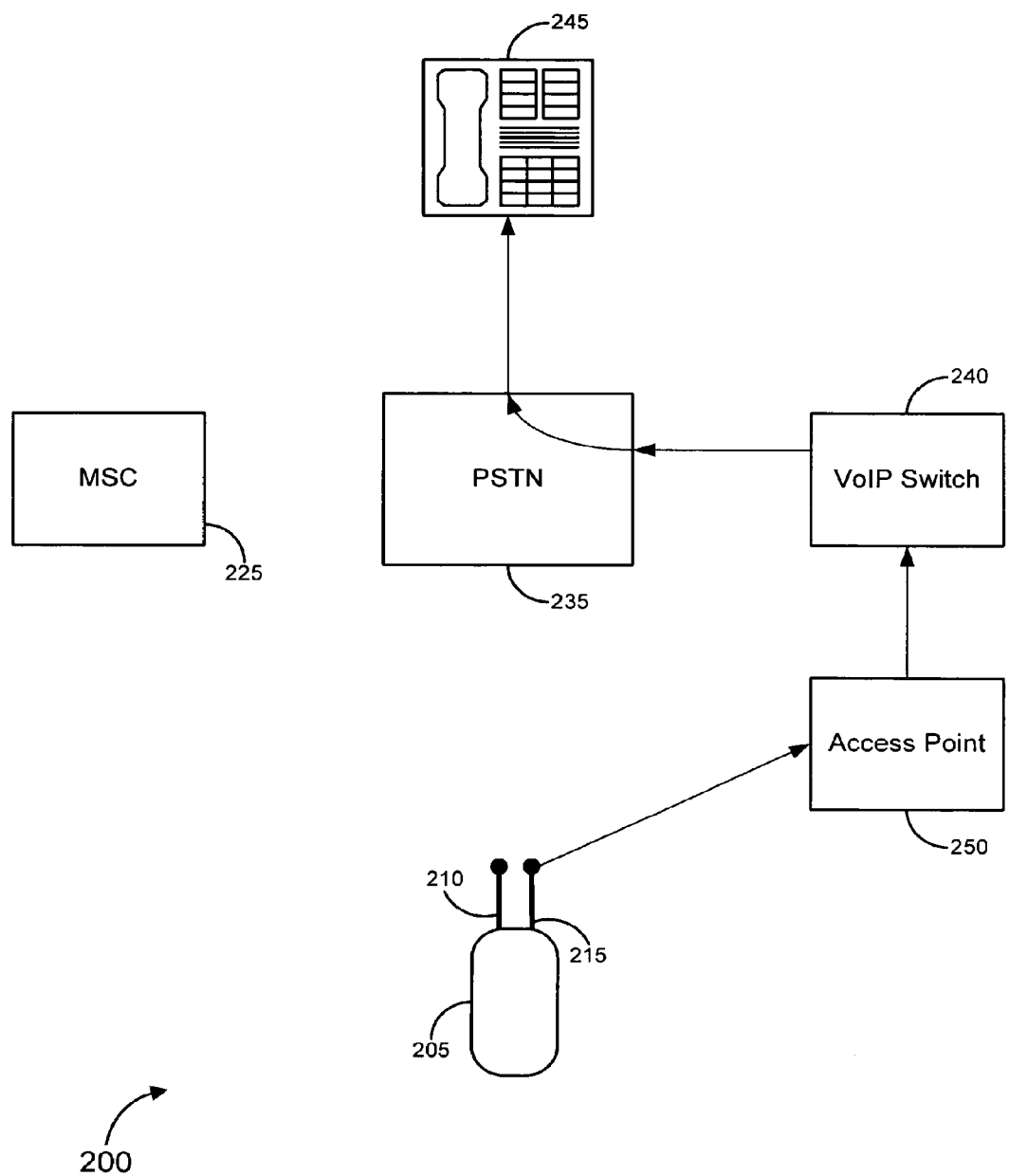

FIG. 2E illustrates the call flow once the cellular network has been disconnected. The transmission path runs from the phone 205 to the VoIP switch 240 (generally through an IP network and/or an access point 250, as described above), through the PSTN 235 to the destination 245. Hence, in accordance with some embodiments of the invention, the subscriber no longer is subject to cellular charges, the VoIP provider no longer is subject to charges related to the connection with the MSC 225 (e.g., a trunk connection, etc.), and the MSC 255 regains the use of the port(s) previously occupied by the call.

As noted above, alternative hardware configurations may be utilized in some embodiments of the invention. Merely by way of example, FIGS. 3A and 3B illustrate two alternative configurations, although others are possible as well.

Figure 3A:
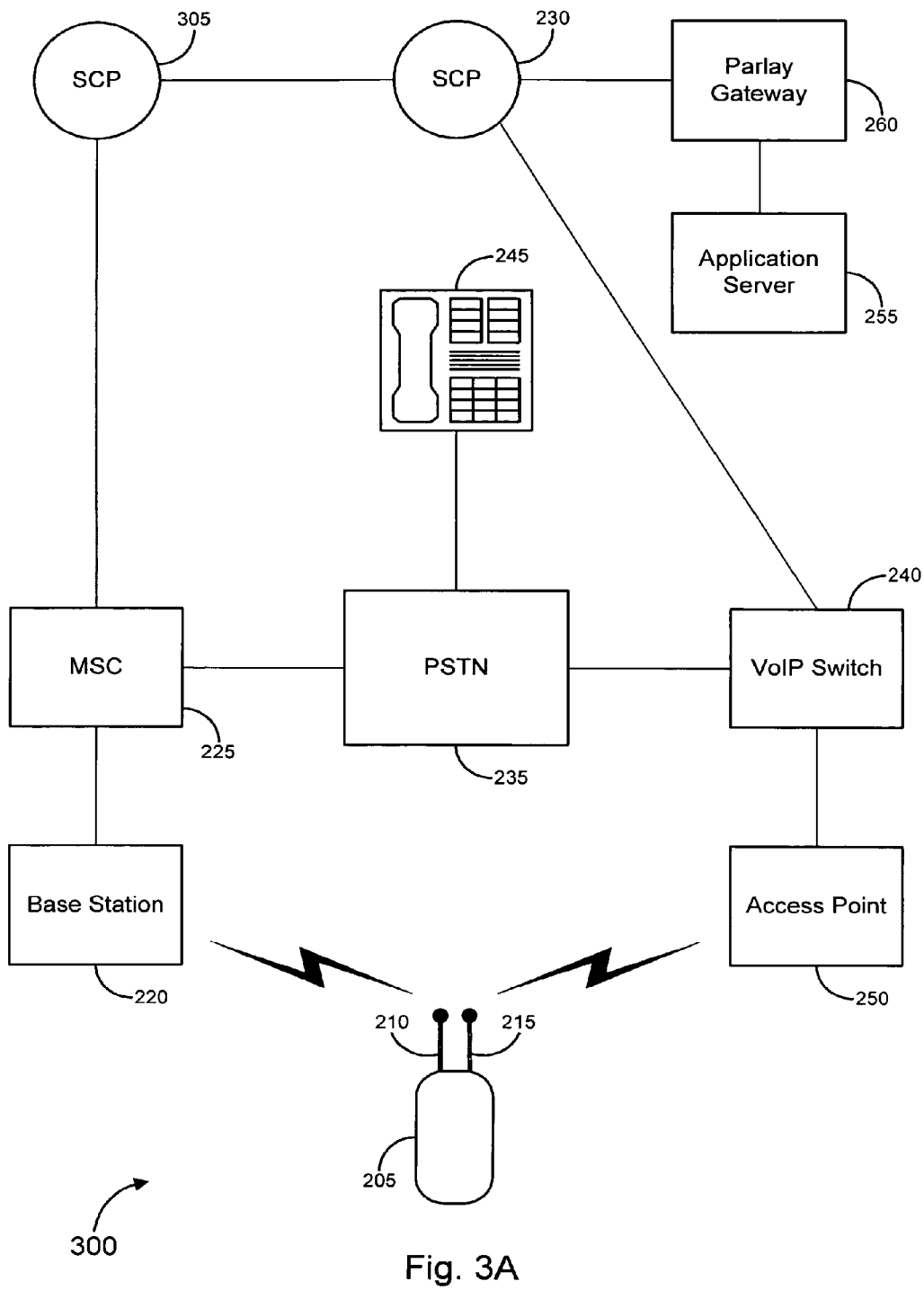
FIGS. 3A and 3B illustrate alternative configurations of a telecommunications system, in accordance with various embodiments of the invention.

FIG. 3A illustrates a system 300 similar to the system 200 of FIG. 2A, except that the system 300 includes an additional SCP 305. For instance, in some embodiments, the SCP 305 may be operated as part of the cellular network (and/or another network, which may be operated by the cellular provider). As such, the SCP 305 may not be configured to operate in accordance with the invention (e.g., it may not be configured to store a destination number, provide a destination number to the VoIP switch 240, etc.). Accordingly the SCP 230 may be in communication with the SCP 305 (perhaps through one or more intermediary devices such as STPs, etc.) and/or may be configured to perform as the SCP 230 described with respect to FIGS. 1 and 2A-2B. In the system 300 of FIG. 3A, then, the SCP 305 may simply pass relevant communications, e.g., from the MSC 225 (TCAP messages, etc.) to the SCP 230, which may then respond accordingly, perhaps via the first SCP 230. The SCP 230, as noted above, may also communication with the VoIP switch 240 (directly and/or via the first SCP 230 and/or any appropriate intermediate devices) and/or may be equipped to handle requests from the VoIP switch 240.

Figure 3B:
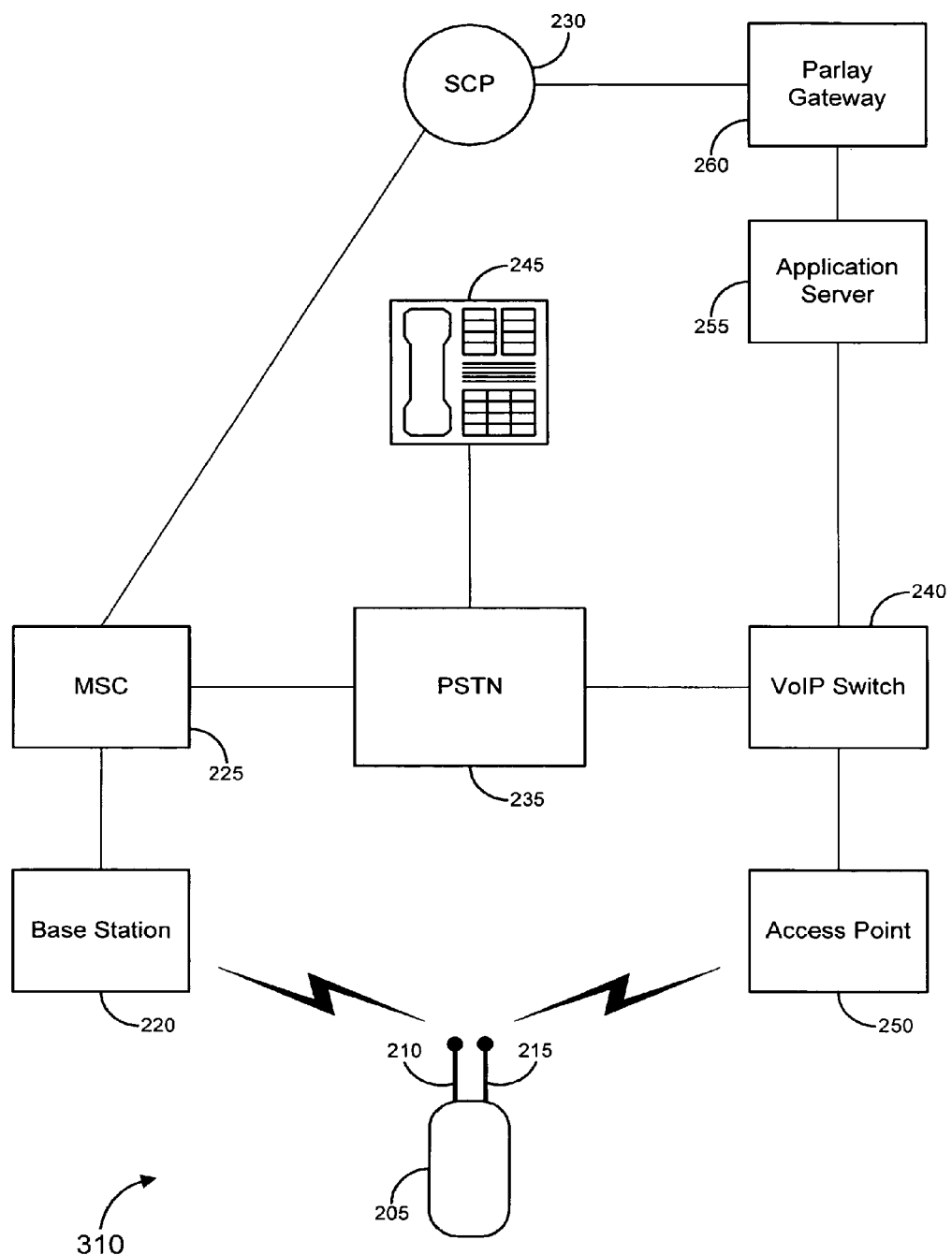

FIG. 3B illustrates another exemplary system 310 having another alternative configuration. In the system 310, the SCP 230 might not be configured to communicate (e.g., via SIP, etc.) with the VoIP switch 240. Accordingly, the application server 255 might be configured to communicate directly with the VoIP switch, e.g., through any appropriate path (the Internet, a dedicated connection, using intermediary devices such as routers, etc.). As noted above, a parlay gateway 260 might provide communication between the application server 255 and the SCP 230. Hence, the application server 255 might be operated by the VoIP provider, and/or the parlay gateway might provide secured communication with the SCP 230, which might be operated by the cellular provider (or another). Such arrangements are familiar to those skilled in the art.

Figure 4:
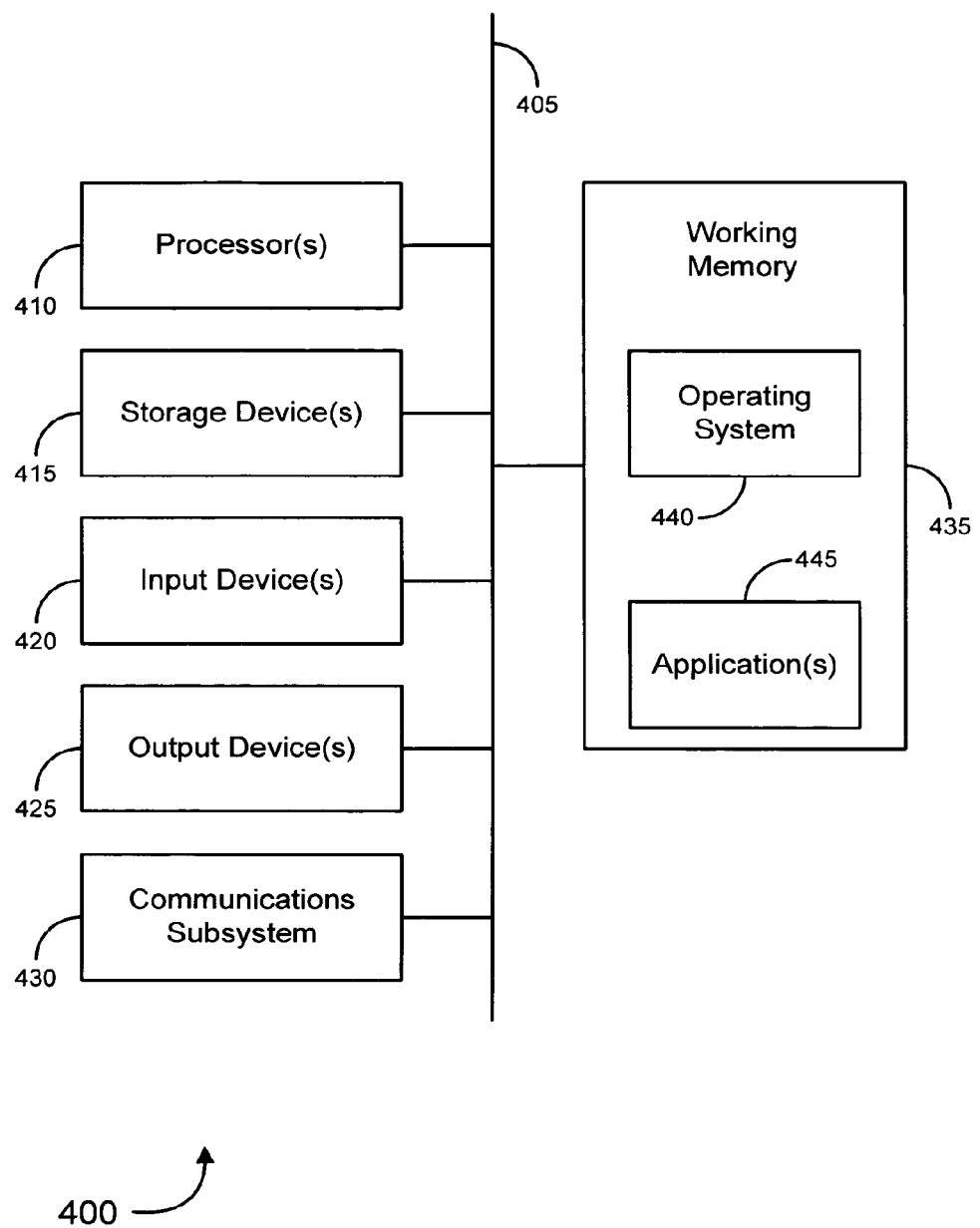
FIG. 4 is a generalized schematic drawing illustrating a computer system that may be used in accordance with various embodiments of the invention.

In the embodiments described above, standard equipment may be used, perhaps with modification as necessary to function in accordance with embodiments of the invention. Merely by way of example, a standard MSC, SCP, application server, parlay gateway, etc. may be used. In some cases, general computers may also be used to perform the functions of one or more of these devices (e.g., an application sever, VoIP softswitch, etc.) FIG. 4 provides a generalized schematic illustration of one embodiment of a computer system 400 that can perform the methods of the invention and/or the functions of such devices, as described herein. FIG. 4 is meant only to provide a generalized illustration of various components, any of which may be utilized as appropriate. The computer system 400 can include hardware components that can be coupled electrically via a bus 405, including one or more processors 410; one or more storage devices 415, which can include without limitation a disk drive, an optical storage device, solid-state storage device such as a random access memory ("RAM") and/or a read-only memory ("ROM"), which can be programmable, flash-updateable and/or the like (and which can function as a data store, as described above). Also in communication with the bus 405 can be one or more input devices 420, which can include without limitation a mouse, a keyboard and/or the like; one or more output devices 425, which can include without limitation a display device, a printer and/or the like; and a communications subsystem 430; which can include without limitation a modem, a network card (wireless or wired), an infra-red communication device, and/or the like. In some cases, the communication subsystem 430 may include specialized hardware familiar to those skilled in the art, such as switching fabric and/or ports, fiber cards, etc.

The computer system 400 also can comprise software elements, shown as being currently located within a working memory 435, including an operating system 440 and/or other code 445, such as an application program as described above and/or designed to implement methods of the invention. Those skilled in the art will appreciate that substantial variations may be made in accordance with specific embodiments and/or requirements. For example, customized hardware might also be used, and/or particular elements might be implemented in hardware, software (including portable software, such as applets), or both.

Figure 5:
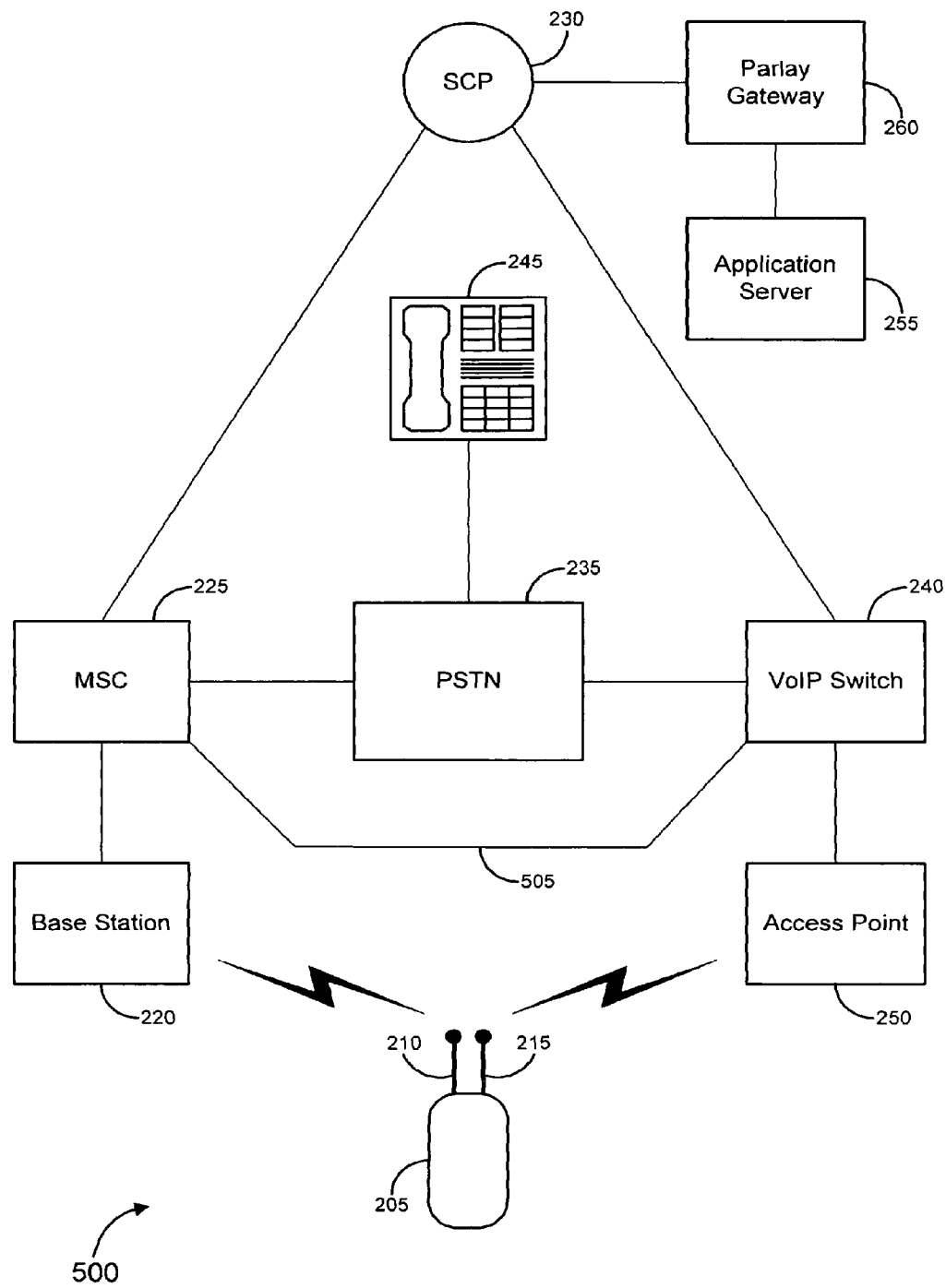
FIG. 5 illustrates an exemplary telecommunications system, in accordance with various embodiments of the invention.

Other embodiments can utilize various other structures and/or implement various other features. Merely by way of example, FIG. 5 illustrates a system 500 in which the MSC 225 is in communication with a VoIP system (which might include a VoIP switch 240) via some direct and/or dedicated facilities 505. (The MSC 225 may or may not be aware that the VoIP system is in fact a VoIP system. Merely by way of example, the MSC 225 may view the VoIP system as another MSC.) The facilities 505 can be any appropriate communication facilities known in the art, including without limitation direct/dedicated ISDN user part ("ISUP") facilities, an ISDN facility, such as a primary rate interface ("PRI"), etc. In some such cases, for example, the VoIP switch 240 might be configured to appear to the cellular network (and, in particular MSC 225) as an MSC within the cellular system. The SCP 230 (e.g., in response to a WIN trigger) and/or a translation index (which might be a specialized translation index defined by the profile for a dual-mode user) may instruct the MSC 225 to route the call to a direct/dedicated facility (which happens to be connected with and/or pointed toward the VoIP switch 240). The MSC 225 may or may not be aware that the direct/dedicated facility provides a connection to the VoIP system. Based on the disclosure herein, one skilled in the art will appreciate that this procedure can be similar to the procedure used to establish a VPN connection. In some cases, because direct/dedicated facilities are used, the destination number, included in the ISUP initial address message ("IAM"), may not need to be modified, such that the VoIP system can obtain the destination number from the IAM message itself.

Figure 6:
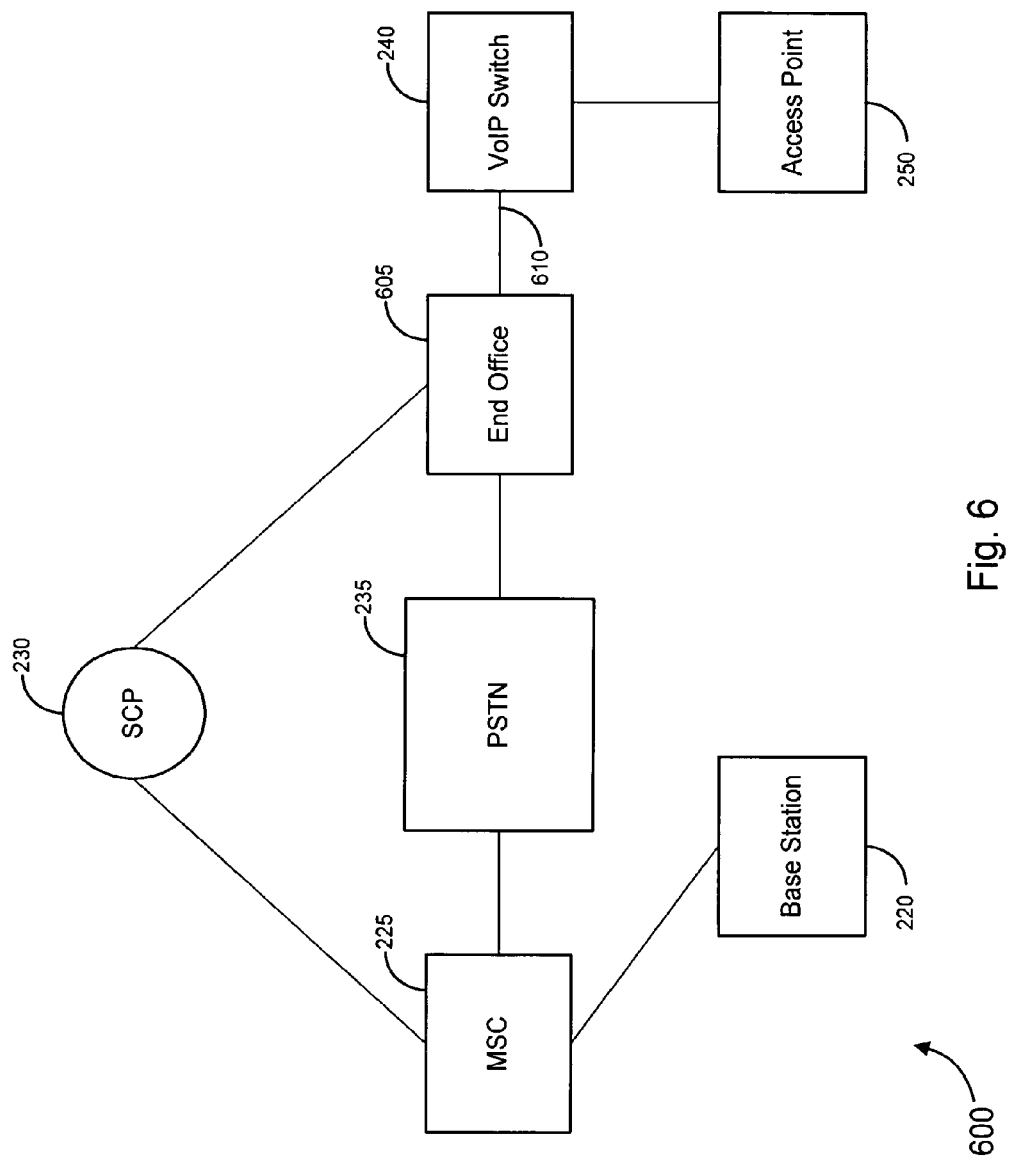
FIG. 6 illustrates an exemplary telecommunications system, in accordance with various embodiments of the invention.

FIG. 6 illustrates another exemplary system 600 in accordance with some embodiments of the invention. (It should be noted that, while the dual-mode phone and the destination phone are not illustrated on FIG. 6 for ease of description, those components, which are similar to those described with respect to other figures herein, may be considered part of the system illustrated by FIG. 6, in some embodiments.) In the system depicted by FIG. 6, the VoIP switch 240 is in communication with an end office 605, which provides connectivity with the PSTN 235 (and, thereby, the MSC 225). (It should be noted that, in a particular set of embodiments, FIG. 6 can be considered to illustrate a specific case of the system illustrated more generally by FIG. 2A.). The end office 605, in some embodiments, communicates with the VoIP switch 240 via a primary rate interface ("PRI").

As noted above, in some cases, a message (and/or a field therein, such as, for example, a primary, secondary and/or optional directory number field) between the MSC and the VoIP switch might be used to communicate information about the destination number of the call. In a particular set of embodiments, an ISUP IAM, which is well-known to those familiar with SS7 and other telecommunication systems, may be used to convey such information. In some cases, however, the PSTN 235 might not be configured to allow an ISUP IAM to pass properly from the MSC 225 to the VoIP switch 240 (and/or, if the end office is in communication with the VoIP system via a PRI, the mapping from an ISUP IAM to a PRI setup message may not include the destination number information). In such cases, if the ISUP IAM is used to pass the destination number for the call from the MSC 225 to the VoIP switch 240, the destination number might be removed from the message or otherwise rendered unusable by the VoIP switch 240. Hence, in some cases, it may not be desirable to rely exclusively on storing the destination number in an ISUP IAM. Further, there may be cases in which it is not desired to allow the VoIP switch access to the SCP 230 (for example, if the cellular provider maintains the SCP 230, and the VoIP switch 240 is managed by a different entity, company policy and/or regulatory restraints may prevent the cellular provider from allowing the VoIP switch 240 access to the SCP 230).

Figure 7:
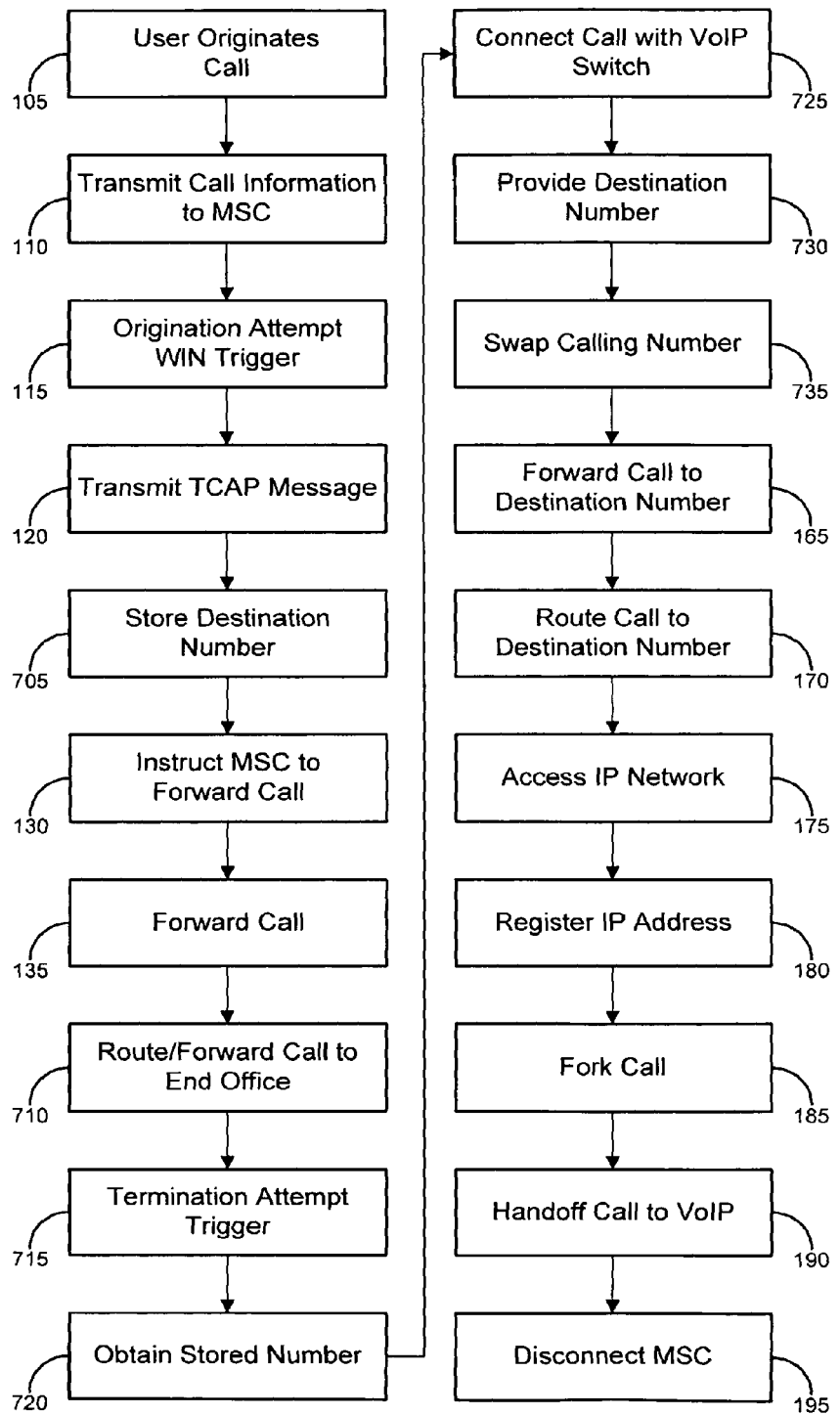
FIG. 7 illustrates a method of handling a cellular call in a VoIP environment, in accordance with various embodiments of the invention.

In such cases, then, the end office 605 may be used as the proxy for the VoIP switch 240 in obtaining the destination number. FIG. 7 illustrates a method 700 of providing the destination number to the VoIP switch 240 in accordance with some such embodiments. In accordance with the method 700 of FIG. 7, the origination of the call (block 105), the transmission of call information to the MSC (block 110), the origination attempt trigger (block 115) and the transmission of the TCAP message (block 120) are similar to those procedures in the method 100 of FIG. 1. (Many of the procedures described with respect to FIG. 7 are similar to those procedures described with respect to FIG. 1, and are numbered accordingly.)

At block 705, the SCP stores the destination number. The storing of the destination number can take a variety of forms. In one embodiment, the SCP will store the destination number at the SCP (and/or a device in communication with the SCP, such as an application server, another SCP, etc., as described in detail above). In another embodiment, the SCP may instead (and/or in addition) instruct the MSC to store the destination number in a message field (such as a primary, secondary and/or optional field of an ISUP IAM that the MSC uses to forward/redirect the call to the VoIP switch, or any other appropriate message or message field).

The SCP then instructs the MSC to forward/redirect the call to the VoIP switch (block 130), for instance as described above, and the MSC does so (block 135). Based on the disclosure herein, one skilled in the art will appreciate that forwarding/redirecting the call to the VoIP switch will, in many embodiments, comprise routing the call to an end office responsible for providing service to the VoIP switch (which may be configured as a PBX in communication with the appropriate end office). Hence, the call is routed (e.g., by the PSTN) and/or forwarded/redirected to (e.g., via direct/dedicated facilities) to the VoIP switch and/or to the end office serving the VoIP switch (block 710).

In some embodiments, the end office will be configured with a termination attempt trigger ("TAT") associated with the number(s) provisioned for the VoIP switch (block 715). Hence, when the end office receives the routed call, the TAT will instruct the end office to provide special processing for that call. In some cases, the TAT will force the end office to seek instructions from the SCP (and/or another SCP, etc.). The SCP then, will instruct the end office to obtain the destination number from the location in which it was stored (block 720).

The nature of the instructions often will depend on how the SCP instructed the MSC to store the destination number. Merely by way of example, if the SCP stored the number at the SCP (and/or another device), the SCP will instruct the end office to obtain the destination number from that source. As another example, if the SCP instructed the MSC to store the destination number in a field in the ISUP IAM, the SCP might instruct the end office to obtain the destination number from that field. Based on the disclosure herein, one skilled in the art will appreciate that there are a variety of ways in which the destination number might be stored, and by which the end office might obtain the destination number. Merely by way of example, if the destination number is always stored in a particular field, the end office might be configured merely to obtain the number from that field, without having to consult the SCP for instructions. There may be relative advantages to the different schemes described above. Merely by way of example, one advantage of storing the destination number in a field (such as an ISUP field) and instructing the end office to obtain the number from that field is that this mechanism is stateless from the perspective of the SCP and the end office—the SCP does not have to know what the stored number is; it merely instructs the end office to check a particular field for the number. Hence, the SCP does not need to know to what call a particular trigger relates. Other advantages of various schemes will be apparent to one of skill in the art.

Returning to FIG. 7, the end office will connect the call with the VoIP switch (block 725). In many cases, in connecting the call with the VoIP switch, the end office will also provide the destination number to the VoIP switch (so that the VoIP switch can connect the call as appropriate). The number may be provided in any appropriate manner. In a set of embodiments, the end office might provide the destination number as part of a PRI setup message (assuming the VoIP switch has a PRI connection with the end office), or via any other appropriate call setup message.

In certain embodiments, the TAT trigger in block 715 may be optional. As an alternative, when the call reaches the VoIP system, the VoIP system can query an application server for the number, for example as described with respect to FIG. 1. As yet another alternative, there may be a natural ISUP-to-PRI mapping, such that the end office does not need to seek instructions from the SCP in order to obtain the destination number but instead the destination number will be translated from the ISUP message to the PRI setup message transmitted to the VoIP system and blocks 715, 720 and 730 therefore can be considered optional.

The VoIP switch, then, will connect the call with the destination number, for instance as described above (blocks 165-170). Further, the transition from a cellular call to a VoIP call might be performed as described above (blocks 175-195).

In some embodiments, the VoIP switch might also swap a first calling number (which might be associated with the cellular system) of the dual mode phone with a second calling number (which might be associated with the VoIP system) (block 735), e.g., prior to connecting the call (e.g., transmitting a call setup message to the PSTN). In this way, caller-identification information conveyed with the call routed to the destination number will reflect the phone's VoIP number as the calling number, so that the called party will not attempt to return a call to the cellular number.

Merely by way of example in a two-number environment (that is, where the phone 205 is provisioned with two numbers, e.g., a first number associated with the cellular system and a second number associated with the VoIP system), it may be advantageous to maintain the cellular number as a "private" number that is not provided to the public. Hence, the only "public" number will be the VoIP number. In this way, all incoming calls will be routed through the VoIP system, allowing the VoIP provider to maintain call control and provide continued dual-mode functionality. For instance, as described above, if a call is connected via only the cellular network, it can be administratively burdensome to transition the call to a VoIP network if the phone obtains IP access mid-call; in contrast, if the call is routed through the VoIP system originally (even if it is also routed through the cellular system), it is easier to transition from cellular to VoIP service, if and when sufficient IP access becomes available to support VoIP service.

Figure 8A:
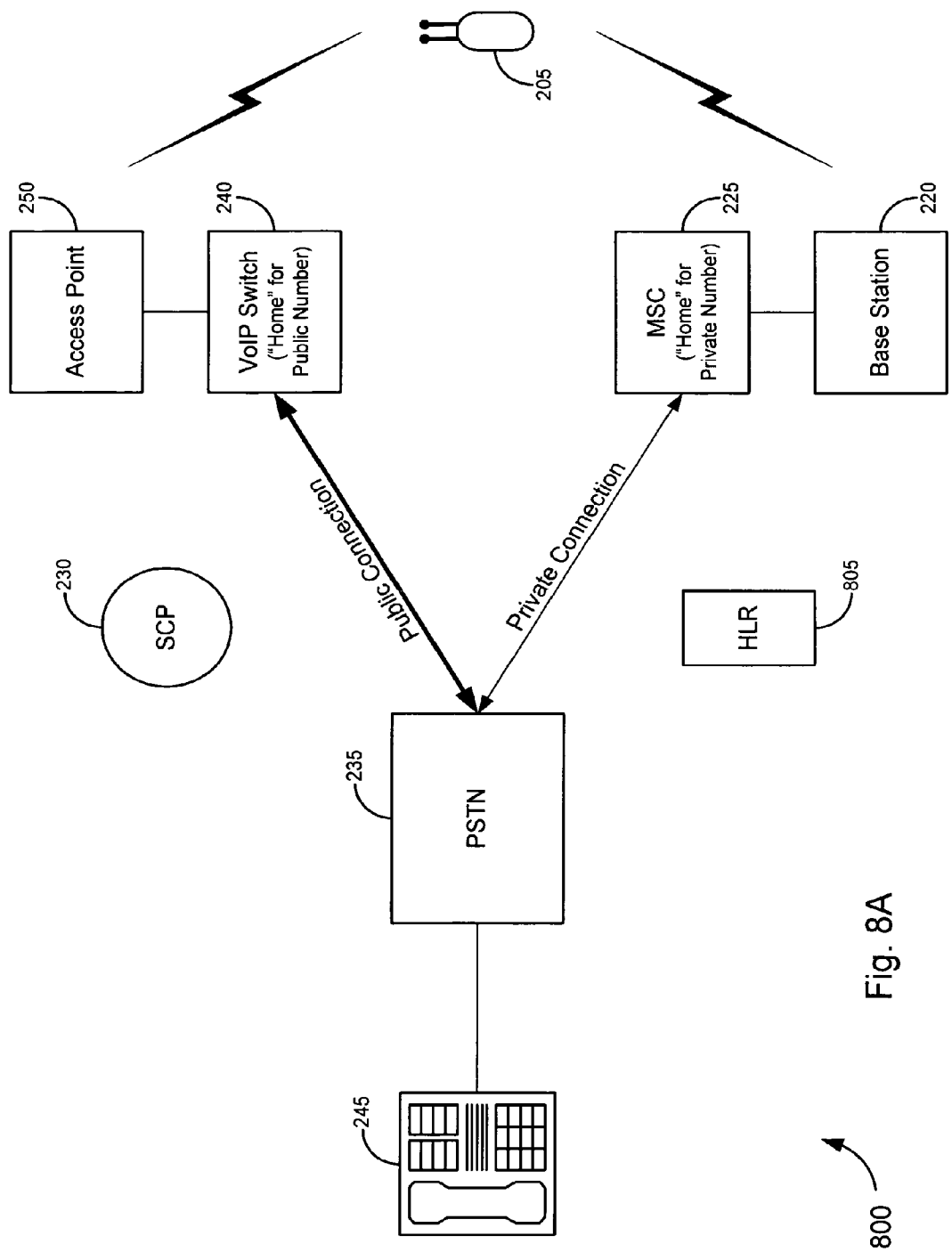
FIGS. 8A and 8B illustrate an exemplary telecommunications system in which a VoIP system and a cellular system communicate via a PSTN, in accordance with embodiments of the invention.
Figure 8B:
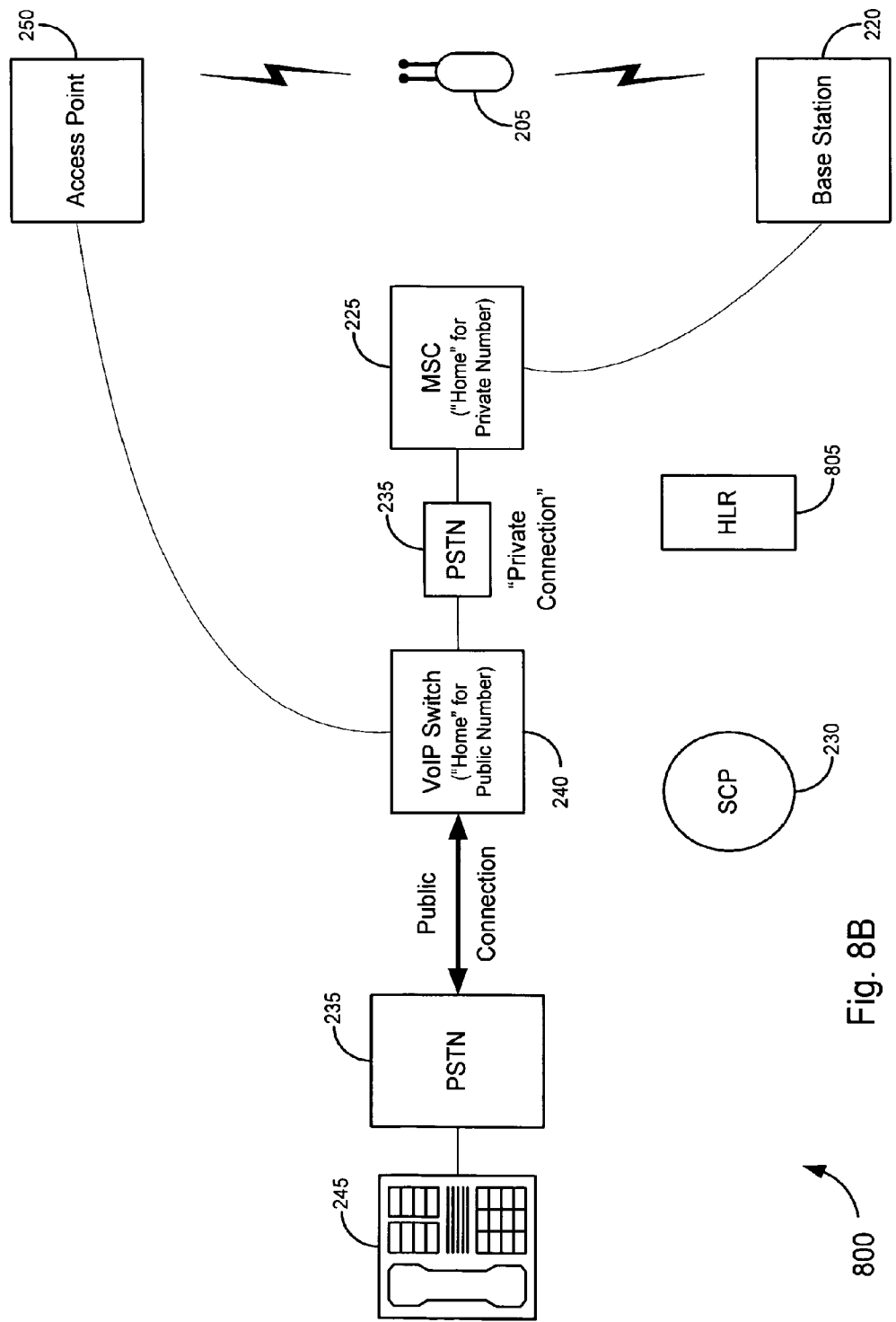
Figure 9A:
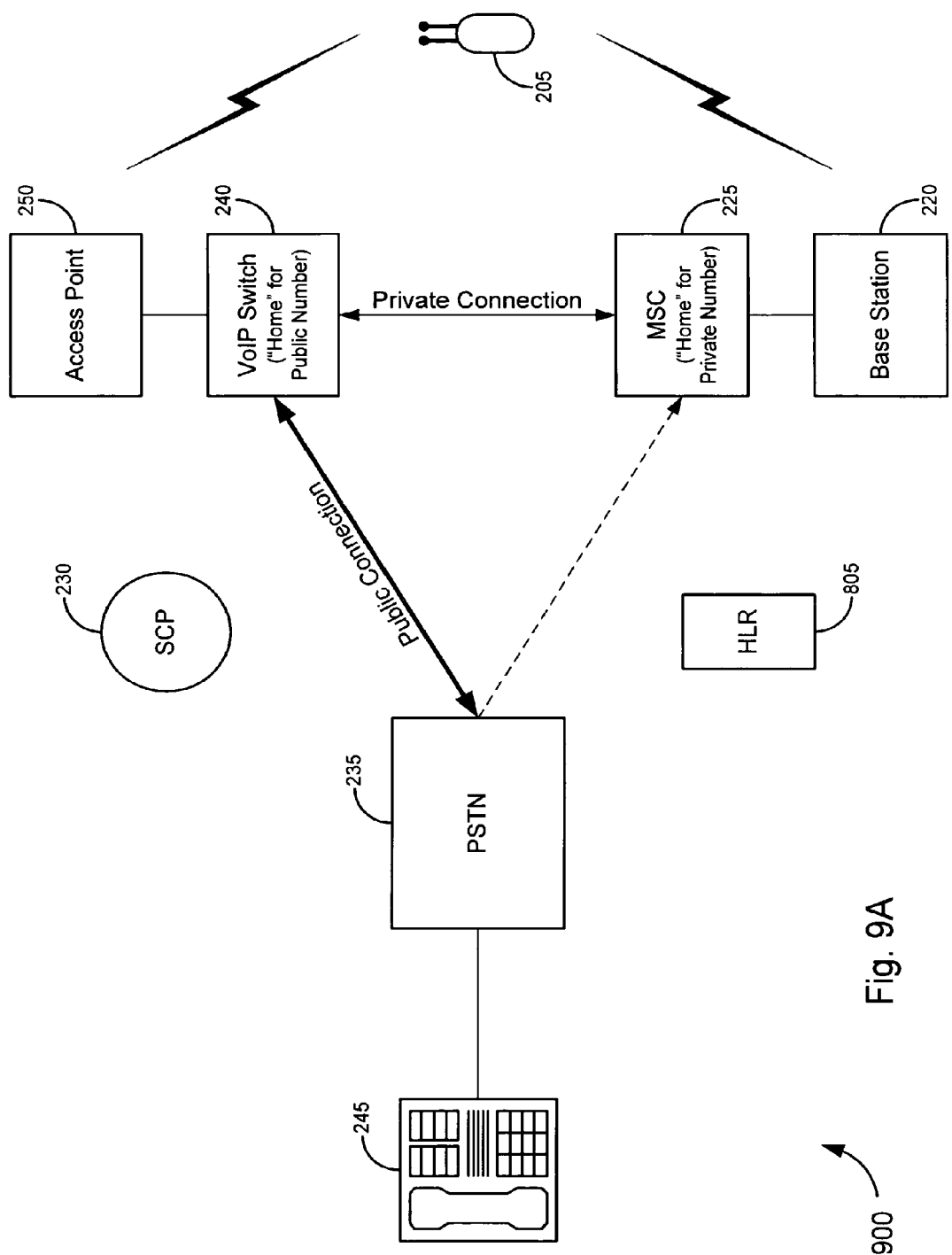
FIGS. 9A and 9B illustrate an exemplary telecommunications system in which a VoIP system and a cellular system communicate via direct and/or dedicated facilities.
Figure 9B:
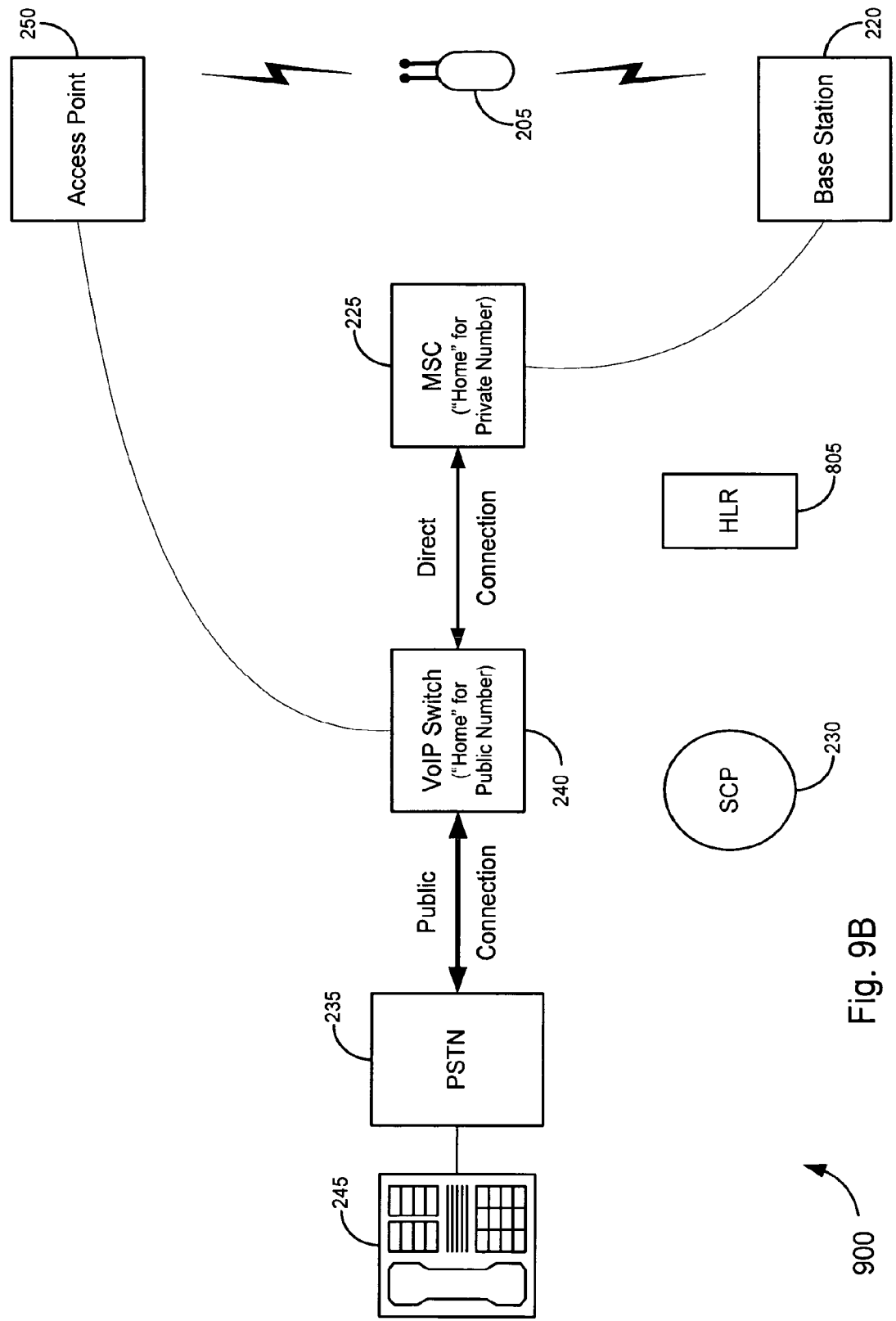

Hence, various embodiments of the invention provide systems and methods for setting up calls (including both incoming and outgoing calls) on a dual mode phone that allow the VoIP system to maintain call control. While some exemplary embodiments are described above, further embodiments described below will illustrate this functionality in more detail. By way of example, FIGS. 8A and 9A illustrate two exemplary systems 800 and 900, respectively, that can provide such functionality in accordance with different embodiments of the invention; FIGS. 8B and 9B depict the systems of 8A and 9A, respectively, organized in a way that illustrates the functional arrangement of various system components.

Turning to FIGS. 8A and 8B, the VoIP switch 240 and the MSC 225 each maintain a connection with the PSTN 235 (any suitable types of connections, including without limitation those described above, may be provided for the VoIP switch 240 and MSC 225, respectively). Functionally, however, although the MSC 225 has a connection with the PSTN 235, all public communications (that is, all public communications involving a dual-mode phone 205; other communications, such as those involving a traditional cellular phone, may be routed between the MSC 225 and the PSTN 235 in a conventional manner) between the MSC 225 and PSTN 235 are routed through the VoIP switch 240. That is, the MSC 225 communicates with the PSTN 235 only for the purpose of communicating with the VoIP switch, and the VoIP switch 240 serves as a gateway between the MSC 225 and the PSTN 235 for call routing purposes—in other words, all outgoing calls originating from a dual-mode phone 205 (whether they originate from the cellular network or the VoIP network) are routed through the VoIP switch 240, while all incoming calls are incoming on the VoIP number, such that they are routed first to the VoIP switch 240 (which may then route them, e.g., via the PSTN 235, to the MSC 225 if the phone 205 does not have IP connectivity). The system 800 of FIGS. 8A and 8B may also have a home location register ("HLR") 805, which can be used to track registration of the phone 205 while on the cellular system.

This functional arrangement can be seen more clearly through the relationship illustrated by FIG. 8B, in which the VoIP switch 240 provides the public interface with the PSTN 235 for all outgoing and incoming calls. (It should be noted, that in the embodiments depicted by FIGS. 8A and 8B, as can be seen in particular by FIG. 8B, the PSTN 235 may be used to provide connectivity between the VoIP switch 240 and the MSC 225; however, the MSC 225 does not communicate, for example, with destination 245 via the PSTN 235. Instead, on a call using the cellular network, the MSC 225 communicates with the VoIP switch 240 (perhaps via PSTN 235), which in turn communicates with destination 245 via the PSTN 235). (While characterized as a "destination" for ease of description, the destination phone 245 may in fact be an originating caller on calls incoming to the dual mode phone 205.)

FIGS. 9A and 9B illustrate a system 900 that is similar to the system of FIG. 8, except that the MSC 225 and VoIP switch 240 communicate via direct/dedicated facilities (including without limitation those described above), instead of via the PSTN 235. The operation of the system 900 is similar to that of the system of FIG. 8, with perhaps some modifications to account for the presence of direct/dedicated facilities (as opposed to PSTN routing between the MSC 225 and the VoIP switch 240). For example, while the system 800 of FIGS. 8A and 8B might use a WIN trigger and/or a translation index to forward calls through the PSTN from the cellular system to the VoIP system, the system of FIGS. 9A and 9B might use a translation index and/or WIN trigger to route such calls via direct/dedicated facilities between the cellular system (e.g., MSC 225) and the VoIP system (e.g., VoIP switch 240).

Both calls incoming to the dual-mode phone 205 and calls outgoing from the dual-mode phone may be handled with embodiments of the invention (including without limitation the systems of FIGS. 8A and 8B, as well as those of FIGS. 9A and 9B). In discussing the types of calls that such systems may be required to handle, there are four general scenarios to consider: (1) the phone 205 originates a call from the VoIP network; (2) the phone 205 receives an incoming call while on the VoIP network; (3) the phone 205 receives a call while on the cellular network; and (4) the phone 205 originates a call while on the cellular network. Embodiments of the invention can handle each of these scenarios. For scenarios (1) and (2), the cellular network is not involved (unless the phone 205 moves out of IP connectivity during the call, a situation which is addressed in detail below), and the call can be handled generally in a conventional manner for VoIP calls. For scenario (4), a number of solutions are possible, including without limitation those described above with respect to FIGS. 1-4.

In a two-number environment (i.e., where the handset 205 is assigned both a cellular number and a VoIP number), scenarios (2) and (3) each can include two variations, one in which the incoming call is addressed to the cellular number and one in which the incoming call is addressed to the VoIP number. In many embodiments, as described herein, the cellular number may be maintained as a "private" number, and so the first variation generally should not occur, since callers generally will not know the cellular number.

There are some cases, however, in which a call may be received on the cellular number, for example, calls originating from the cellular service provider. In such a case, the MSC 225 can be configured (e.g., via a WIN trigger, and/or based on translation schema tied to dedicated trunking between the MSC 225 and VoIP system) to route all directly incoming calls not to the phone but instead to the VoIP switch 240, in which case, the call resembles a call to the VoIP number. Merely by way of example, the MSC 225 may have a WIN trigger (such as a "termination attempt trigger" (e.g., WIN AnalyzedInfo)) armed that is configured to (1) check to see whether the incoming call is from the VoIP system; (2) if the incoming call is from the VoIP system, connect the call with the phone 205 (since calls forwarded from the VoIP system should be connected); and (3) if the incoming call is not from the VoIP system, re-route the incoming call to the VoIP system, for instance as described above. As another example, the MSC 225 may be configured with a translation schema that identifies a direct/dedicated facility (such as in the systems described above with respect to FIGS. 9A and 9B) with the VoIP switch, such that incoming calls on that facility are connected with the phone 205, while other incoming calls to the cellular number are re-routed to the VoIP system. (It should be noted that, if the phone 205 is not registered with the VoIP system, the VoIP system generally will re-route the call back to the MSC 225 for call completion).

In the second variation of scenarios (2) and (3), described above (i.e., a call incoming to the VoIP number in a two number system), if an incoming call is received by the VoIP system but the phone is not registered with the VoIP switch 240, the VoIP switch 240 often will attempt to forward the call to the cellular system (e.g., the MSC 225 or another MSC) for call termination. In the past, some systems may have been configured to forward a call to a cellular number if the subscriber was not available via VoIP, but any such forwarding mechanisms used "blind forwarding," that is, if the call could not be terminated to a VoIP phone, the VoIP system would blindly forward the call to a cellular number, irrespective of whether a phone was registered on that number at the time.

Figure 10A:
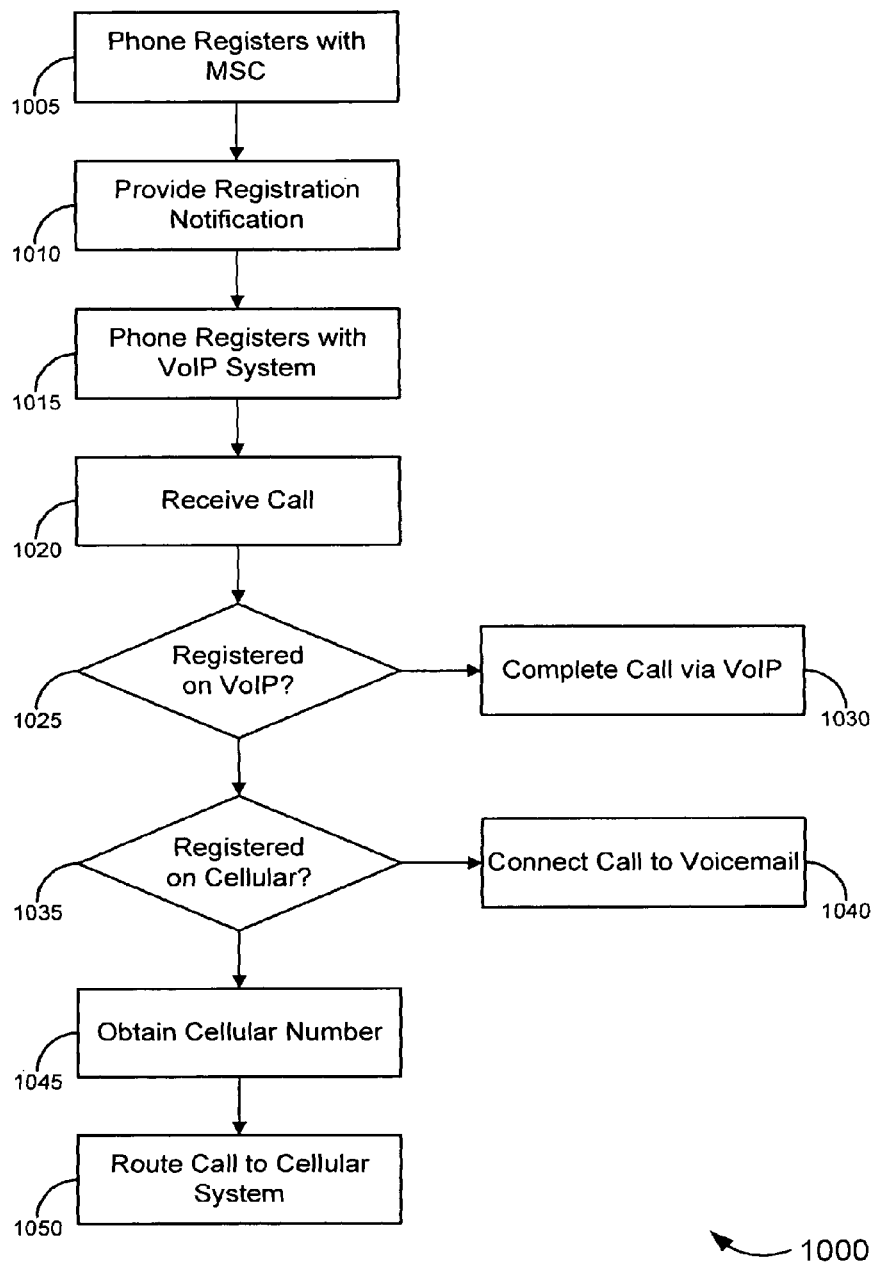
FIGS. 10A and 10B illustrate exemplary methods of routing a call to a cellular system, in accordance with embodiments of the invention.

While certain embodiments of the present invention may be configured to operate in a similar manner, other embodiments exhibit a more intelligent procedure for forwarding calls. One set of embodiments employing this procedure is illustrated by FIG. 10A, which illustrates a method 1000 of completing via a cellular network a call received at a VoIP network. (This method may be used, inter alia, in a two-number system.) The method 1000 includes, in some cases, the phone 205 registering (for example, in a conventional manner) with an MSC 225 in the cellular network (block 1005). In some embodiments, the cellular system (and/or the MSC 225) is configured to provide registration notification (e.g., from a HLR associated with the MSC) about the phone for use by the VoIP system (block 1010). In some cases, this can include pushing registration information (including information about registrations and/or deregistrations of the phone with the cellular system and/or an MSC thereof) to an SCP, application server and/or some other device in communication with the VoIP system.

The phone might also register with the VoIP switch 240 (e.g., via SIP registration), if VoIP access is available to the phone 205 (block 1015). Thus, some embodiments of the invention provide for the phone 205 simultaneously maintaining registrations with both the VoIP network and the cellular network, one novel feature of the present invention.

At some point, the VoIP system 240 receives a call (block 1020), e.g., on the VoIP number for the phone. When the call is received, the phone 205 may or may not be registered on the VoIP and/or cellular systems. The VoIP system 240 thus will determine whether the phone 205 is currently registered with the VoIP network (block 1025). If the phone 205 is registered, the call might be completed (terminated to the phone 205) via a VoIP connection (block 1030). If the phone 205 is not registered (for instance, if the phone has lost contact with the VoIP network and therefore does not have an active registration), the VoIP system will determine whether the phone 205 is registered with the cellular system (block 1035), for instance by obtaining registration information from an SCP, application server, etc. to which the cellular system has provided registration system. (Another way in which this procedure may be performed is by querying an HLR associated with the cellular system for a registration for the phone's cellular number, as described in further detail below).

If the phone is not registered in the cellular system, the VoIP system might take a specified action (such as connecting the call with voicemail (block 1040), transferring the call to another number, giving a notification to the caller, etc.). If the phone is registered with the cellular system, the VoIP system will obtain the number for the phone in the cellular system (block 1045) (if the system is a two-number system, the VoIP system will simply obtain and/or look up the "private" number; in a one number system, the VoIP system might query the HLR and/or SCP, application server, etc. for a TLDN) and then will route the call to the appropriate number in the cellular system for completion (e.g., via the MSC 225) (block 1050), using the PSTN and/or a direct/dedicated facility, as appropriate, to route the call.

In this way, for example, the cellular number (which, again may be considered a "private number" in many embodiments, in that it is not intended to be used by anyone but the VoIP system to place calls to the phone 205, can be considered to be a "permanent" temporary local destination number ("TLDN"), since it can be used by the VoIP system in a manner similar to that in which cellular systems commonly use TLDNs—to locate and address a cellular phone in a location outside of the phone's home calling area).

Figure 10B:
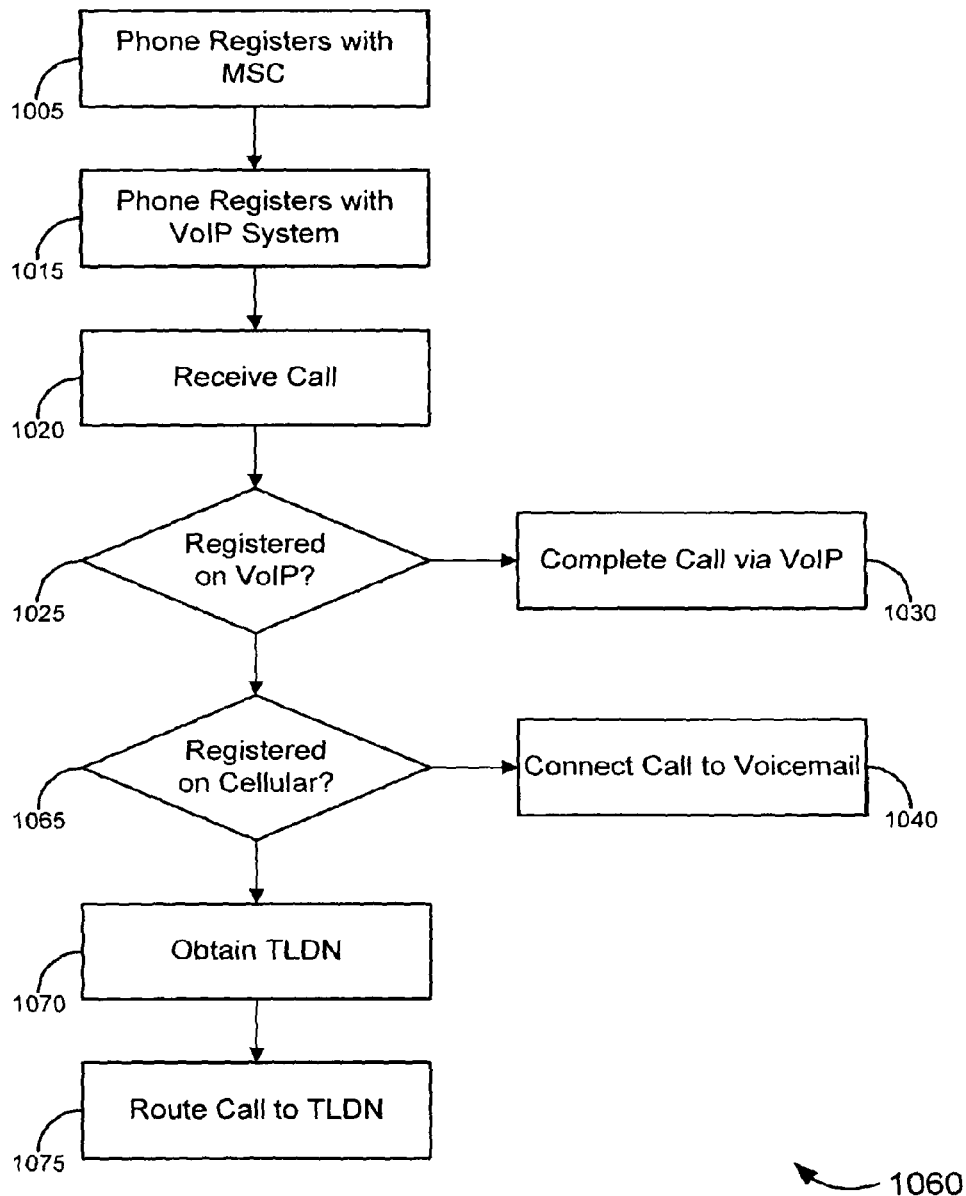

As noted above, the systems of FIGS. 8A and 8B and 9A and 9B, respectively, can be used in a situation in which a phone 205 is provisioned with two numbers (a cellular number and a VoIP) number. The same systems can be used in a one-number system (where the phone is merely provisioned with a single number, which works for both the cellular and VoIP systems). FIG. 10B illustrates a method 1060 of providing service to a phone via the cellular network, in which the VoIP server is viewed by the cellular system as another MSC (either an in-network MSC or an out-of-network MSC). The method 1060 can include similar procedures for registering with the MSC and/or VoIP system (blocks 1005, 1015), receiving a call (block 1020), checking for registration on the VoIP system (block 1025) and/or completing the call via VoIP, if appropriate (block 1030). (In some embodiments, however, since the VoIP system is viewed as an MSC, the VoIP system may have authority to query an HLR associated with the MSC, such that there is no need to provide registration information to another device for use by the VoIP system.)

Assuming the phone is not registered with the VoIP system, the VoIP system will determine whether the phone is registered with the cellular system (and/or an MSC thereof) (block 1065). If the phone is not registered, as described above, an appropriate action (such as connecting the call with voicemail (block 1040) may be taken.

In a set of embodiments (especially those embodiments employing a one-number system), the VoIP switch 240 can be considered the home MSC for the single number (and/or in a two-number system, the home MSC for the VoIP number). (The VoIP switch 240 can also be considered the serving MSC as well, when the phone 205 has VoIP connectivity.) When the phone 205 is operating in the cellular mode (i.e., when the phone does not have VoIP connectivity), the phone 205 can be considered to be visiting another MSC (e.g., the MSC 225). Determining whether the phone is registered with the cellular system, then, can comprise querying an HLR 805 for registration information for the phone. If the phone is registered, a TLDN for the phone 205 may be obtained (e.g., from the HLR), perhaps in a manner known to those skilled in the art. After obtaining the TLDN (block 1070), the VoIP switch 240 routes/forwards the call to the TLDN 1075, and the call therefore is connected by the MSC 225.

The methods of FIGS. 10A and 10B can be performed, inter alia, in the systems of both FIGS. 8A and 8B and FIGS. 9A and 9B. While similar principles apply to each system, the specific procedures used may vary according to the system. Merely by way of example, in the system of FIGS. 8A and 8B, the routing of an incoming call from the VoIP system to the cellular system may be performed via PSTN routing, while in the system of FIGS. 9A and 9B, the routing may be performed via direct/dedicated facilities. In some embodiments, for example, the direct/dedicated facilities between the VoIP system and the cellular system may be configured similarly (and/or may appear to the VoIP system and/or the cellular system to be) a virtual private network ("VPN"), as is known in the art.

In accordance with various embodiments, other variations and/or features may be implemented. Merely by way of example, as noted above, in some embodiments, the VoIP system may be denoted the home MSC for a dual-mode phone. In such embodiments, all calls will be "anchored" at the VoIP system, such that the VoIP system can maintain call control. In certain embodiments, various procedures (including by way of example, a local number portability ("LNP") procedure known to those skilled in the art) can be used to move a dual-mode user to the VoIP system as their home MSC, while still maintaining the user's preexisting number as the "public" number in a two-number system. In a two-number system, for example, the user can then be assigned a new number by the cellular system, which serves as the "private" number (e.g., the permanent TLDN, in some cases) in the two-number system. In a single-number system, the VoIP system may be viewed as an in-network MSC (or an out-of-network MSC) by the MSC 225, and/or the user's cellular number may be ported to the VoIP system as the home MSC (merely by way of example, in a procedure similar to an MSC split known in the art, perhaps using an LNP order). The VoIP system, then, is viewed as the home MSC from a call setup perspective (i.e., incoming calls are first routed through the VoIP system, as described above).

As another example, in many of the described embodiments, WIN triggers are used to provide instructions to the MSC to implement routing functionality. In other embodiments, however, a translation index may be used in lieu of (and/or in addition to) WIN triggers. Merely by way of example, for each dual-mode phone, the translation index at the MSC 225 may be configured to instruct the MSC 225 to route all outgoing calls to the VoIP system.

The translation index (and/or a WIN trigger) similarly may be instructed to route some (or all) incoming calls for a dual-mode handset to the VoIP system. Merely by way of example, in a one-number system, no incoming calls to the handset's number should be routed directly by the MSC to the handset, since all calls routed from the VoIP switch generally will be routed to a TLDN associated with the handset (although such a situation may occur if an in-network call is received from another cellular user). In a two number system, however, calls may be routed from the VoIP system to the phone's cellular number (i.e., the "private" number), since, as noted above, in some cases the cellular number is used as a "permanent" TLDN. Hence, the system may be configured such that the VoIP system provides some type of identifier (e.g., in an ISUP message, etc.) indicating to the MSC that the call is being routed from the VoIP system and therefore should be transmitted to the handset. Alternatively, the SCP might mark that particular call as coming from the VoIP system, and/or the MSC might be configured (via translation index, WIN trigger, etc.) to discriminate between incoming calls from a direct/dedicated facility associated with the VoIP system (which should be routed to the phone) and other incoming calls (which should be routed to the VoIP system).

Figure 11:
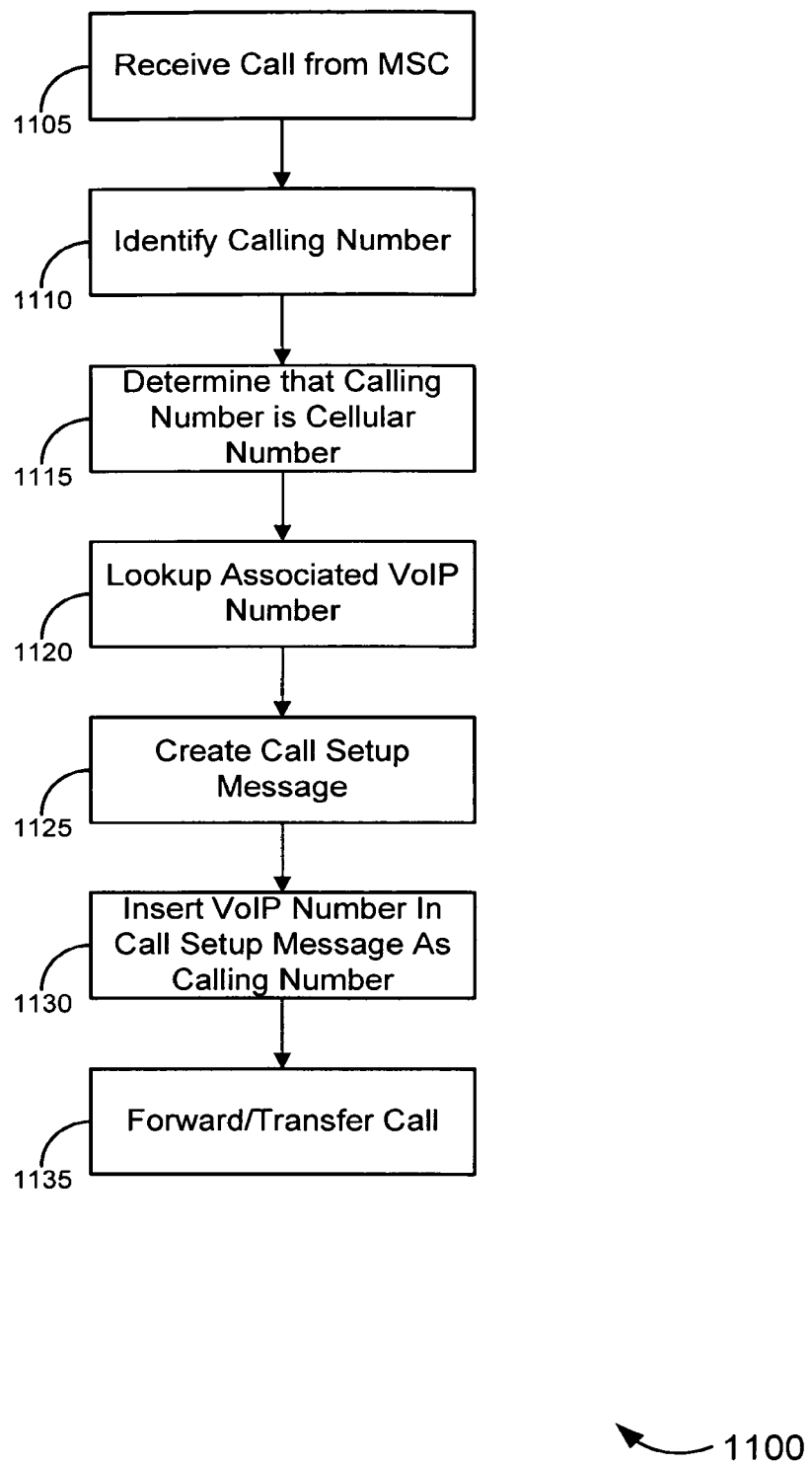
FIG. 11 illustrates an exemplary method of substituting a public number for a private number when routing a call, in accordance with embodiments of the invention.

As noted above, in some embodiments of a two-number system (i.e., where the handset 205 is provisioned with both a cellular number and a VoIP number), it may be advantageous to keep the cellular number "private," so as to prevent callers from using that number to reach the handset—so as to facilitate inducing all incoming calls to go through the VoIP system for call management purposes. FIG. 11 illustrates a method 1100 for swapping the cellular number with the VoIP number on calls outgoing from the cellular system, in accordance with a set of embodiments. (It should be noted that, like other methods discussed herein, the method 1100 of FIG. 11 may be incorporated in and/or performed in conjunction with other described methods.)

At block 1105, the VoIP system receives a call (e.g., from an MSC, although calls could be received from other devices in accordance with various embodiments; it should be noted as well that the call may be routed through various switches and/or other devices between the MSC and the VoIP system). Merely by way of example, the call could be a call originated by a dual-mode handset on a cellular system, and the call may have been transferred (e.g., routed via the PSTN, transferred via a direct/dedicated facility, etc.) as described above. The VoIP system then identifies the calling number (block 1110) (for instance, by parsing the calling number field in a call setup message).

At block 1115, the VoIP system determines that the calling number is the cellular number of a handset that also has a number associated with the VoIP system, and at block 1120, the VoIP system looks up the associated VoIP number. (In many embodiments, blocks 1115 and 1120 may be performed as a single procedure.)

At block 1125, the VoIP system creates a call setup message for routing the call to the destination number. In some embodiments, the VoIP may obtain the destination number from an application server, from an end office in communication with the VoIP system, from a PRI and/or ISUP message, etc., as described in detail above. The VoIP system then inserts into the call setup message, instead of the original calling number, the VoIP number for the dual-mode handset (block 1130). The VoIP system then forwards/transfers the call (e.g., to the PSTN) for routing to the destination number (block 1135).

When the destination number receives the call, it will thus appear to originate from the VoIP number instead of the cellular number. In this way, if the person receiving the call attempts to call the originator back, he or she will call the VoIP number instead of the cellular number. Hence, the cellular number may be maintained as a "private" number, as described above, with the VoIP number given as the "public number." This process thus furthers the principle of having all incoming calls routed through the VoIP system in the first instance, instead of being routed directly to the handset though an MSC in the cellular system.

It should be noted that, in some cases (such as, merely by way of example, in a one-number system), the method 1100 may not need to be used.

Figure 12:
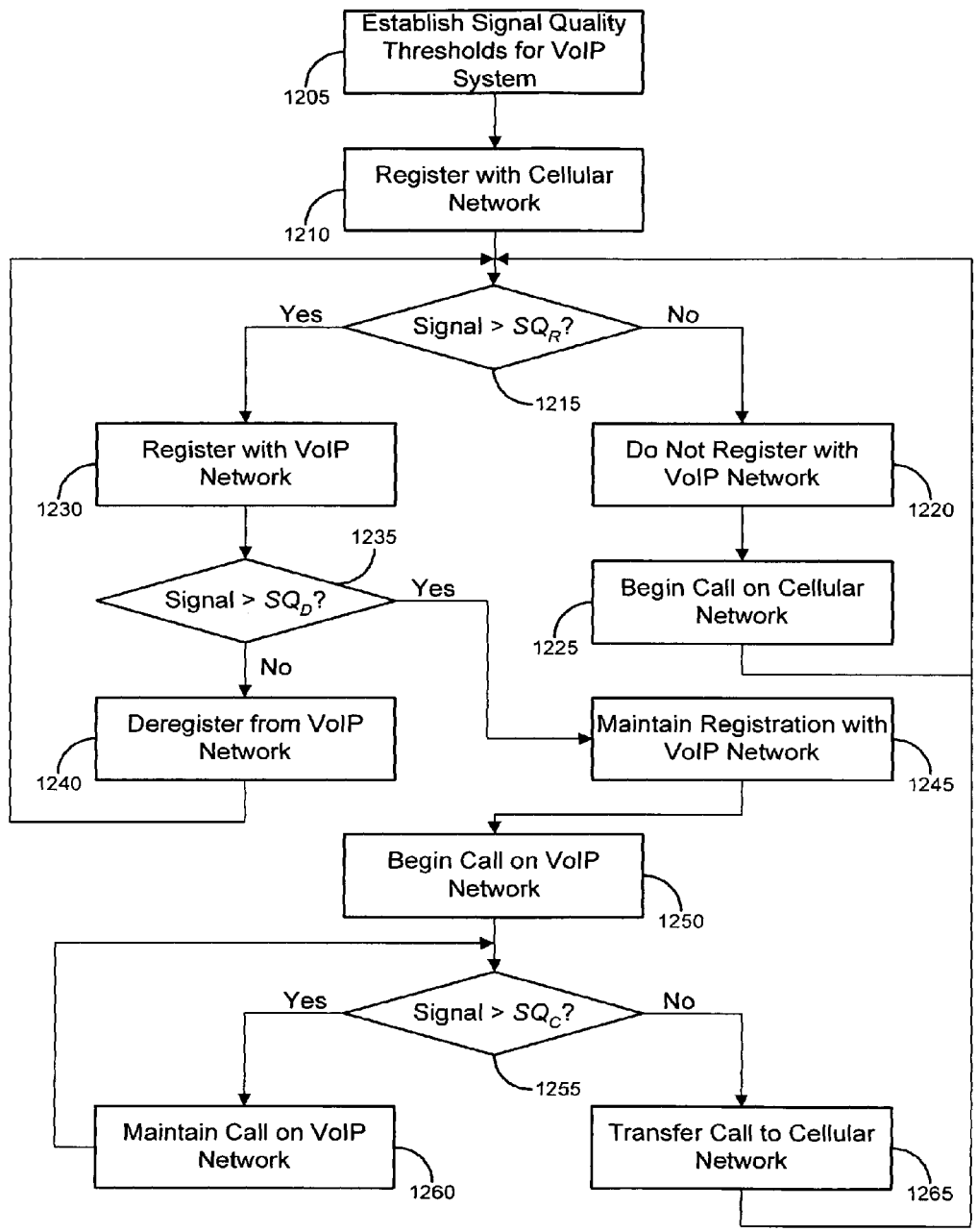
FIG. 12 illustrates an exemplary method of determining whether to handle a call with a VoIP network or a cellular network, in accordance with embodiments of the invention.
Figure 13:
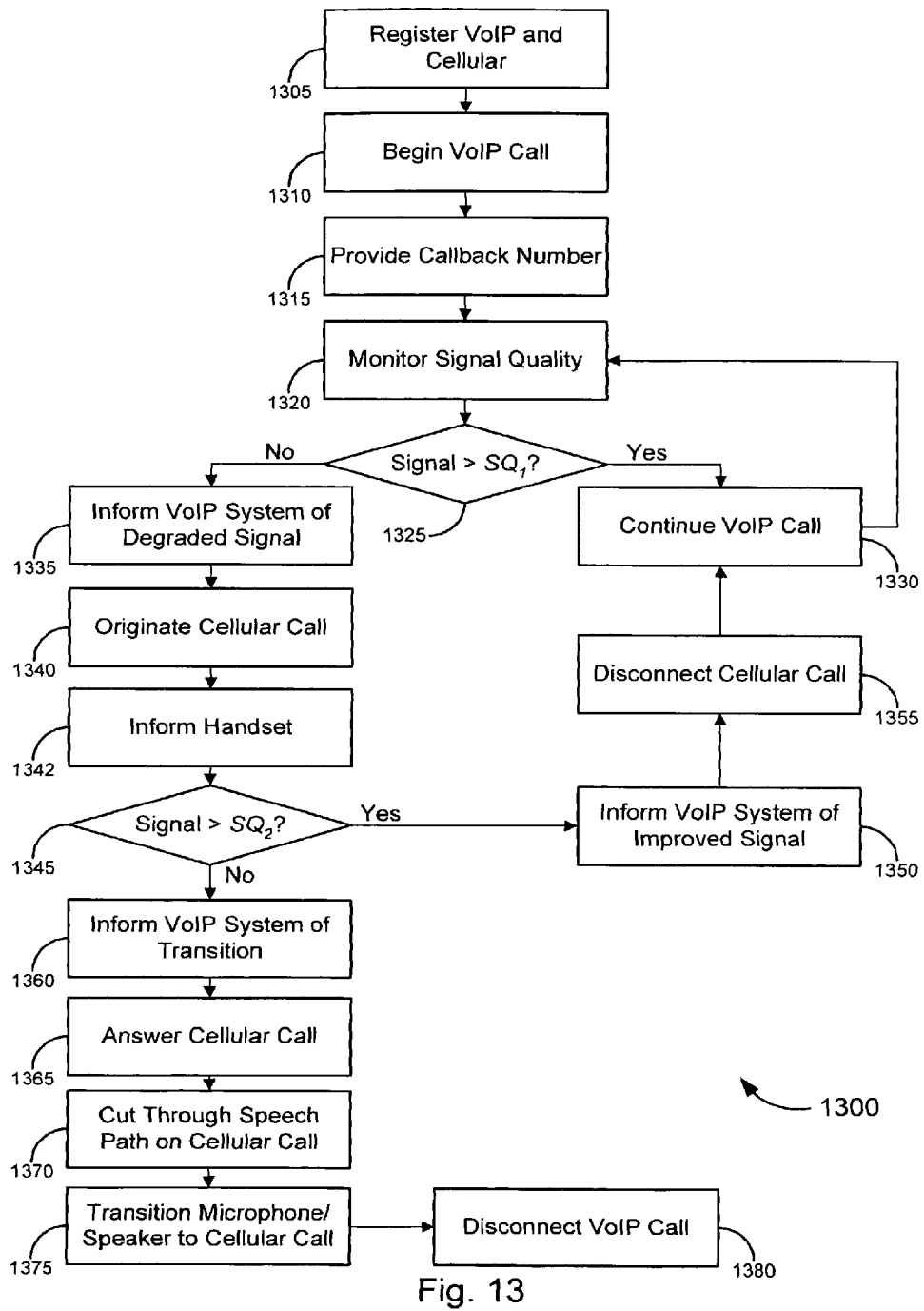
FIG. 13 illustrates an exemplary method of transitioning a call from a VoIP network to a cellular network, in accordance with embodiments of the invention.

One novel feature of certain embodiments is the ability for the handset to be registered in both the cellular network and the VoIP network simultaneously. FIGS. 12 and 13 illustrate methods, in accordance with embodiments of the invention, for managing the registration of a handset in the cellular and/or VoIP networks.

FIG. 12 illustrates a method 1200 of determining whether a handset should switch from VoIP mode to cellular mode (or vice versa). At block 1205, the system establishes a set of signal quality threshold(s) with respect to the VoIP system. The signal quality thresholds can use any appropriate metric (such as received signal strength indication ("RSSI"), signal/noise ratio ("SNR") etc.). (One skilled in the art will appreciate, based on the disclosure herein, that the metrics used in any particular system are discretionary and generally will depend on system-specific characteristics). The signal quality threshold, which might be established at the handset, at the VoIP system, or both, sets a lower bound for signal quality. (One benefit of establishing signal quality thresholds for VoIP service while maintaining both cellular and network registrations is that the transition from VoIP to cellular service (and vice versa) may be performed more quickly.)

The set of signal quality thresholds might include a first signal quality threshold for registering the handset with the VoIP system, below which the handset will not register with the VoIP system. In this example, the first signal quality threshold is designated $SQ_R$. The set of signal quality thresholds might further include a second signal quality threshold ($SQ_D$), below which the handset will deregister from the VoIP network. In some embodiments, the set of signal quality thresholds includes a third threshold ($SQ_C$), below which the handset will attempt to transfer a call from the VoIP network to the cellular network. In a set of embodiments, the value of $SQ_D$ may be equivalent to the value of $SQ_C$. In another set of embodiments, the value of $SQ_D$ may be equivalent to the value of $SQ_R$.

In a particular set of embodiments, however, the relationship between each of the signal quality ratios may be expressed by one or more of the following relationships:

$$SQ_R > SQ_D \quad \text{(Eq. 1)}$$

$$SQ_D < SQ_C \quad \text{(Eq. 2)}$$

In this way, embodiments of the invention may impose a hysteresis on signal quality, such that the handset will maintain a registration with the VoIP system at a signal quality lower than the signal quality threshold ($SQ_R$) that would be required to register the handset in the first instance. This hysteresis can prevent a "ping-pong" effect, where the handset continually registers and deregisters when signal quality fluctuates across a narrow range (such as when transient conditions effect signal strength). In some cases, the offset between $SQ_R$ and $SQ_D$ will be an experimentally-determined and/or system-specific value.

In other embodiments, the system may impose a higher signal quality threshold on the maintenance of a call than on the maintenance of a registration with the VoIP system. In this way, the system can ensure that a call will be transferred to the cellular system before the VoIP signal degrades to the point at which the handset would be deregistered from the VoIP system ($SQ_D$). Alternatively, it may be preferable to allow the handset to maintain a call even at a signal quality that would trigger a deregistration if the handset were not participating in a call, such that $$SQ_D > SQ_C \quad \text{(Eq. 3)}$$

Under either of these options, the offset between $SQ_D$ and $SQ_C$ may be an experimentally-determined and/or system-specific value. (Of course, as noted above, $SQ_D$ and $SQ_C$ may be the same threshold, such that a call will be transferred to the cellular system at the same signal quality that will trigger deregistration). As described below with respect to FIG. 13, in some cases, the system may take preemptive action to initiate the transfer of a call to the cellular system before signal quality degrades below any of these thresholds.

At block 1210, the handset registers with a cellular network. Registration with a cellular network may be performed in a conventional manner, and it generally involves a handshake procedure between the handset and a cellular base station. Once the handset is registered with the cellular network, it generally is available to originate and/or receive calls via the cellular network (e.g., in a two-number system, using the cellular number).

At block 1215, a determination is made whether the VoIP signal (that is, the wireless IP signal over which the VoIP connection is carried) received by the phone is greater than a first signal quality threshold (which might be $SQ_R$, as described above). If the signal is not greater than this threshold, the handset does not register with the VoIP network (block 1220), and any call in which the handset participates will be handled by the cellular network (assuming cellular service is available) (block 1225) (As shown on FIG. 12, the handset may continue to monitor for a suitable VoIP signal, and if one is obtained, register with the VoIP network and/or transfer the call to the VoIP network, for instance as described above with respect to FIGS. 1 and 2).

If the VoIP signal is above the first threshold, the handset registers with the VoIP network (block 1230). As noted above, registration with the VoIP network can comprise the handset participating in a SIP registration process and/or any other process in which the handset makes itself available to originate and/or receive a VoIP call. While the handset is registered with the VoIP network, the handset (and/or the network) monitors signal quality to ensure that it remains above a second threshold (e.g., $SQ_D$, as described above). If the signal quality drops below this second threshold, the handset deregisters from the VoIP network (block 1240) and thereafter becomes unavailable for VoIP services until such time as the signal quality rises above the first threshold (e.g., $SQ_R$) (block 1215). While the signal quality remains above the second threshold, the handset maintains its registration with the VoIP network (block 1245).

While registered on the VoIP network, the handset may begin a VoIP call (block 1250). This might be a call originated from the handset and/or received by the handset, and call setup may utilize standard and/or proprietary VoIP standards (such as a SIP invite, etc.). While the handset is in the call, it monitors the signal quality, and so long as the signal quality stays above a third threshold (e.g., $SQ_C$), which, again, may or may not be the same threshold as $SQ_R$ and/or $SQ_D$, the call is maintained on the VoIP network (block 1260). In some embodiments, if the signal quality drops below this third threshold, the call is transitioned to the cellular network (block 1265). One exemplary method for transitioning the call to the cellular system, in accordance with some embodiments of the invention, is described with respect to FIG. 13.

Once the call is transitioned to the cellular system, the VoIP system (and/or the handset) may continue to monitor the signal quality of the VoIP signal, and if the signal quality climbs above a specified threshold (block 1215), the system might try to reestablish a VoIP registration and/or transition the call back to the VoIP network. As noted above, in certain embodiments, the thresholds will be configured to impose a hysteresis, such that, if the call is transitioned to the cellular network, the thresholds will require a substantially better signal before re-registering the handset with the VoIP network and/or transitioning the call back to the VoIP network.

Variations are possible. Merely by way of example, in the methods illustrated by FIG. 12, if the handset is unable to register with the cellular network (at block 1210), the handset (and/or the VoIP system) may be configured such that the handset registers with the VoIP network, maintains the registration, and/or maintains an active call whenever there is sufficient signal to do so, even if the signal quality falls below a specified threshold (i.e., the threshold is not enforced).

Moreover, the handset (and/or the VoIP system) may be configured to continually (and/or periodically) monitor the cellular connection, such that even if a cellular registration was originally present when the handset registered with the VoIP system (and/or began a call), if the handset deregisters on the cellular side (e.g., if the cellular signal connection is lost), the handset (and/or VoIP system) reverts to a mode, as described above, where the threshold(s) are not enforced. Conversely, if the handset registers (and/or begins a call) when there is no cellular registration (and thus, in some cases, where the thresholds are ignored, but the handset subsequently registers with a cellular network, the handset (and/or VoIP system) might transition to a mode where the thresholds are enforced.

The handset (and/or the VoIP system) thus can transition between enforcing and not enforcing the thresholds multiple times (even during a single call) as appropriate, depending on the availability of a cellular connection. Hence, embodiments of the invention can provide an optimum balance between VoIP service and cellular service while still maintaining maximum VoIP connectivity when there is no cellular service.

As noted above, FIG. 13 illustrates a method 1300 of transitioning a call in-progress from a VoIP system to a cellular system, so that the call can be maintained in the event the handset loses IP connectivity (for instance, if the handset travels outside the effective range of a wireless access point.) In accordance with some embodiments, the handset will register with both the VoIP and cellular networks (block 1305), e.g., as described above and/or as known in the art. Once again, it is worth noting that some embodiments support the simultaneous (or parallel) registration of the handset on both the VoIP and cellular networks.

At block 1310, the handset begins a VoIP call (that is, a call using the VoIP network). The call can be originated by the handset and/or terminated at the handset. In some embodiments, the VoIP system will provide a cellular handoff leg callback number ("callback number") (block 1315), which the handset can use to dial into the VoIP system (e.g., via the cellular system, as described below) if the handset loses IP connectivity or is otherwise unable to continue the call in a VoIP mode. The callback number can be provided in many ways. Merely by way of example, the callback number might be provided to the handset upon registration and/or as part of a call setup message, etc. (In some cases, the callback number might be provided at the point the handset and/or the VoIP system detects a degraded VoIP signal.) In a set of embodiments, as described in further detail below, the VoIP system might call the handset (e.g., over the cellular network), such that providing a callback number is unnecessary.

During the call, the VoIP system and/or the handset monitors the signal quality of the connection between the handset and the VoIP system (block 1320). This may be performed as described above with respect to FIG. 12. So long as the signal remains above a certain threshold (denoted on FIG. 13 as $SQ_1$, which might or might not be the same threshold as $SQ_R$, $SQ_D$, and/or $SQ_C$ described above), the call is continued in the VoIP mode (block 1330), and the handset and/or VoIP system continue to monitor the signal quality during the call.

If the VoIP system and/or the handset detects that the signal has fallen below $SQ_1$, the handset may, in some cases, inform the VoIP system of the degraded signal (perhaps through out-of-band signaling such as a SIP message, etc.) (block 1335). (If the VoIP system is monitoring signal quality, there may be no need to inform the VoIP system of the degraded signal quality, and/or the VoIP system may in fact inform the handset of this fact). A call between the VoIP system and the handset is then set up over the cellular network (block 1340). This may take several forms. In one set of embodiments, the handset may originate a call via the cellular system (this is possible due, in some cases, to the simultaneous registration of the handset on the VoIP system and the cellular system) to the callback number provided in block 1315 above, or alternatively, to a specified number stored on the handset, etc. In another set of embodiments, the VoIP system might originate a call (over the PSTN, via direct/dedicated facilities, etc.) to the cellular number of the handset. (This can be provided as a fallback mechanism as well, in case the handset does not have a valid callback number.)

In some embodiments, then, the handset and/or the VoIP system will determine whether VoIP signal quality has fallen below a second threshold $SQ_2$, (which may or may not be the same threshold as $SQ_1$, $SQ_R$, $SQ_D$, and/or $SQ_C$) (block 1345). If the signal has not fallen below $SQ_2$, the handset optionally informs the VoIP system of the improved (or perhaps non-degraded) signal (block 1350) (e.g., via a SIP message, etc.), disconnects the cellular call (block 1355) and continues the call on the VoIP network (block 1330).

If the signal quality has fallen below $SQ_2$, the handset might inform the VoIP system that it is transitioning to the cellular call (block 1360), again perhaps through out-of-band signaling, such as a SIP message, etc. In embodiments where the handset originates the cellular call in block 1340, this message might cue the VoIP system to answer the cellular call (block 1365). In some embodiments, when the VoIP receives the cellular call, the VoIP may inform the handset (block 1342). Furthermore, in some embodiments, the VoIP system may wait for confirmation before answering the call, so as to avoid incurring the expense of an unneeded cellular connection. (Based on the disclosure herein, those skilled in the art will appreciate that the cellular call originated by the handset can remain unanswered for 30-60 seconds, or longer, allowing more than sufficient time to perform the procedures referenced by blocks 1345 and 1360). Alternatively, if the VoIP system originates the cellular call, the handset might answer the call at this point.

When the cellular call has been connected, the VoIP system will cut through a speech path on the cellular call (block 1370). In some embodiments, this will comprise forking and/or bridging the VoIP call with the cellular call, such that the handset now has two connections with the VoIP system: one via the cellular network (and the PSTN, direct/dedicated facilities, etc.), and one via the original IP connection between the handset and the VoIP system. The handset (perhaps in response to a SIP notification, etc. from the VoIP system) transitions the microphone and/or speaker functions from the VoIP mode to the cellular mode (block 1375), such that the handset user is communicating on the call via the cellular connection. At this point, the VoIP system and/or the handset disconnects the VoIP speech path (block 1380), and the call proceeds over the cellular path. (The described embodiments can be considered a "make-then-break" methodology, wherein the VoIP system first establishes a secondary speech path via the cellular connection and then breaks down the speech path via the VoIP connection. Other embodiments might employ a "break-then-make" methodology, wherein these operations are reversed.)

While the embodiments described with respect to FIG. 13 denote one way of transitioning a call, other ways are possible as well. Moreover, it should be noted that methods similar to those illustrated by FIG. 13 may be used to transition a cellular call to a VoIP system. Merely by way of example, while the embodiments depicted by FIGS. 1 and 2 illustrate a method of transitioning from cellular to VoIP originated by the VoIP system, other embodiments can make this transition with the handset as the originator, similar to the methods described with respect to FIG. 13.

It should be noted that the systems and methods discussed herein are intended to be only exemplary in nature. Consequently, various embodiments may omit, substitute and/or add various procedures and/or components as appropriate. It should be appreciated that in alternative embodiments, the methods may be performed in an order different than that described. It should also be appreciated that the methods described above may be performed by hardware components and/or may be embodied in sequences of machine-executable instructions, which may be used to cause a machine, such as a general-purpose or special-purpose processor or logic circuits programmed with the instructions, to perform the methods. These machine-executable instructions may be stored on one or more machine readable media, such as CD-ROMs or other type of optical disks, floppy diskettes, ROMs, RAMs, EPROMs, EEPROMs, magnetic or optical cards, flash memory, or other types of machine-readable media suitable for storing electronic instructions. Merely by way of example, some embodiments of the invention provide software programs, which may be executed on one or more computers, for performing the methods described above. In particular embodiments, for example, there may be a plurality of software components configured to execute on various hardware devices (such as an MSC, SCP, application server, VoIP switch, etc.). Alternatively, the methods may be performed by a combination of hardware and software.

In conclusion, the present invention provides novel solutions for handling calls, particularly in a mixed-mode cellular/VoIP environment. While detailed descriptions of one or more embodiments of the invention have been given above, various alternatives, modifications, and equivalents will be apparent to those skilled in the art without varying from the spirit of the invention. Moreover, except where clearly inappropriate or otherwise expressly noted, it should be assumed that the features, devices and/or components of different embodiments can be substituted and/or combined. Thus, the above description should not be taken as limiting the scope of the invention, which is defined by the appended claims.

What is claimed is:

1. A method for handling a call involving a dual-mode handset capable of operating in a cellular mode and in a voice over Internet Protocol ("VoIP") mode, the method comprising:
   a dual-mode handset participating in a first call with an other party, the first call being carried on a VoIP connection with a VoIP system;
   determining that a signal quality for the VoIP connection has fallen below a first threshold;
   originating a second call between the VoIP system and the dual-mode handset, wherein the second call is carried by a cellular system;
   answering the second call;
   bridging the first call and the second call;
   the dual-mode handset transitioning a microphone function and a speaker function from the first call to the second call, such that the dual-mode handset is in communication with the other party via the second call; and
   disconnecting the first call.

2. The method recited in claim 1, wherein the dual-mode handset originates the second call and the VoIP system answers the second call.

3. The method recited in claim 1, wherein the VoIP system answers the call only after receiving a confirmation message from the dual-mode handset that the dual-mode handset is transitioning to a cellular call.

4. The method recited in claim 1, wherein the VoIP system originates the second call and the dual-mode handset answers the second call.

5. A telecommunication system for handling a call involving a dual-mode handset capable of operating in a cellular mode and in a voice over Internet Protocol ("VoIP") mode, the system comprising:
   a VoIP system configured to provide VoIP service to a dual-mode handset, wherein the VoIP system is further configured to:
      carry a first call over a VoIP connection between the dual-mode handset and an other party;
      determine that a signal quality for the VoIP connection has fallen below a first threshold;
      answer a second call originated by the dual-mode handset and carried by a cellular system configured to provide cellular service to the dual-mode handset;
      bridge the first call and the second call; and
      disconnect the first call.

6. The system recited in claim 5, wherein the first call is disconnected after the dual-mode handset transitions a microphone function and a speaker function from the first call to the second call, such that the dual-mode handset is in communication with the other party via the second call.

7. The system recited in claim 5, wherein the VoIP system determines that the signal quality for the VoIP connection has fallen below a first threshold based on receiving a message from the dual-mode handset that the signal quality has fallen below the first threshold.

8. The system recited in claim 5, further comprising the cellular system.

9. A telecommunication system for handling a call involving a dual-mode handset capable of operating in a cellular mode and in a voice over Internet Protocol ("VoIP") mode, the system comprising:
   a VoIP system configured to provide VoIP service to a dual-mode handset, wherein the VoIP system is further configured to:
      carry a first call over a VoIP connection between the dual-mode handset and an other party;
      determine that a signal quality for the VoIP connection has fallen below a first threshold;
      originate a second call directed to the dual-mode handset and carried by a cellular system configured to provide cellular service to the dual-mode handset;
      bridge the first call and the second call; and
      disconnect the first call.

10. The system recited in claim 9, wherein the first call is disconnected after the dual-mode handset transitions a microphone function and a speaker function from the first call to the second call, such that the dual-mode handset is in communication with the other party via the second call.

11. The system recited in claim 9, wherein the VoIP system determines that the signal quality for the VoIP connection has fallen below a first threshold based on receiving a message from the dual-mode handset that the signal quality has fallen below the first threshold.

12. The system recited in claim 9, further comprising the cellular system.

13. A dual-mode handset capable of operating in a cellular mode and in a voice over Internet Protocol ("VoIP") mode, wherein the dual-mode handset is configured to:
   participate in a first call with an other party over a VoIP connection with a VoIP system;
   originate, based on a determination that a signal quality of the VoIP connection has fallen beneath a first threshold, a second call to the VoIP system carried by a cellular system configured to provide cellular service to the dual-mode handset; and
   transition a microphone function and a speaker function from the first call to the second call, after the first call and the second call have been bridged by the VoIP system, such that the dual-mode handset is in communication with the other party via the second call.

14. The dual-mode handset recited in claim 13, further configured to:
   determine that the signal quality for the VoIP connection has fallen beneath the first threshold.

15. The dual-mode handset recited in claim 14, further configured to:
   provide an indication to the VoIP system that the VoIP connection has fallen beneath the first threshold.

16. The dual-mode handset recited in claim 13, further configured to:
   receive an indication from the VoIP system that the signal quality for the VoIP connection has fallen beneath the first threshold.

17. A dual-mode handset capable of operating in a cellular mode and in a voice over Internet Protocol ("VoIP") mode, wherein the dual-mode handset is configured to:
   participate in a first call with an other party over a VoIP connection with a VoIP system;
   receive, based on a determination that a signal quality of the VoIP connection has fallen beneath a first threshold, a second call from the VoIP system and carried by a cellular system configured to provide cellular service to the dual-mode handset; and
   transition a microphone function and a speaker function from the first call to the second call, after the first call and the second call have been bridged by the VoIP system, such that the dual-mode handset is in communication with the other party via the second call.

18. The dual-mode handset recited in claim 17, further configured to:
   determine that the signal quality for the VoIP connection has fallen beneath the first threshold.

19. The dual-mode handset recited in claim 18, further configured to:
   provide an indication to the VoIP system that the VoIP connection has fallen beneath the first threshold.

20. The dual-mode handset recited in claim 17, further configured to:
   receive an indication from the VoIP system that the signal quality for the VoIP connection has fallen beneath the first threshold.

* * * * *